(12) United States Patent
Onizawa et al.

(10) Patent No.: US 7,732,520 B2
(45) Date of Patent: Jun. 8, 2010

(54) RESIN COMPOSITION

(75) Inventors: Tomomitsu Onizawa, Chiyoda-ku (JP);
Yoshihide Nishihiro, Chiyoda-ku (JP);
Atsushi Hayashida, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 436 days.

(21) Appl. No.: 11/886,087

(22) PCT Filed: Mar. 14, 2006

(86) PCT No.: PCT/JP2006/005475

§ 371 (c)(1),
(2), (4) Date: Sep. 11, 2007

(87) PCT Pub. No.: WO2006/098461

PCT Pub. Date: Sep. 21, 2006

(65) Prior Publication Data

US 2008/0176048 A1 Jul. 24, 2008

(30) Foreign Application Priority Data

Mar. 16, 2005 (JP) .............................. 2005-074760
Jul. 14, 2005 (JP) .............................. 2005-205250

(51) Int. Cl.
*C08K 3/34* (2006.01)

(52) U.S. Cl. ........................ 524/449; 524/445; 524/451; 524/494; 524/601; 524/611

(58) Field of Classification Search ................. 524/445, 524/449, 451, 494, 601, 611

See application file for complete search history.

(56) References Cited

U.S. PATENT DOCUMENTS

2003/0004251 A1  1/2003  Hashimoto et al.

FOREIGN PATENT DOCUMENTS

| EP | 1300445 A1 | 4/2003 |
|---|---|---|
| JP | 2-294358 | 12/1990 |
| JP | 4-224920 | 8/1992 |
| JP | 06-238704 | 8/1994 |
| JP | 6-279664 | 10/1994 |
| JP | 07-112448 | 5/1995 |
| JP | 08-057904 | 3/1996 |
| JP | 8-259789 | 10/1996 |
| JP | 9-12847 | 1/1997 |
| JP | 2001-164105 | 6/2001 |
| JP | 2002-265769 | 9/2002 |
| JP | 2003-128905 | 5/2003 |
| JP | 2003-171564 | 6/2003 |

OTHER PUBLICATIONS

Japanese Office Action issued Dec. 22, 2009 in corresponding Japanese Application 2005-074760 with English translation.
Supplementary European Search Report issued Jul. 31, 2009 in counterpart European Application No. 06715703.
Mikell Knights, Sequential Valve Gating, "Ultimate Control of the Toughest Molding Jobs", Plastics Technology, Dec. 2003, pp. 38-43.

*Primary Examiner*—Edward J Cain
(74) *Attorney, Agent, or Firm*—Wenderoth, Lind & Ponack, L.L.P.

(57) ABSTRACT

It is an object of the present invention that a resin composition which has high chemical resistance while retaining high fluidity, is excellent in impact resistance, heat resistance, stiffness and heat stability and comprises an aromatic polycarbonate and polyethylene terephthalate, a molded product thereof and a process of manufacturing a car exterior material.

This invention provides the resin composition which comprises 50 to 100 wt % of a resin component and 0 to 50 wt % of an inorganic filler (component D), wherein
the resin component is composed of (i) an aromatic polycarbonate (component A) having a specific viscosity average molecular weight and (ii) polyethylene terephthalate (component B) having a specific intrinsic viscosity (IV), a specific terminal carboxyl group content and a specific ratio (Mw/Mn) of weight average molecular weight (Mw) to number average molecular weight (Mn), and (iii) the weight ratio {(A+D)/B} of the total of the components A and D to the component B is 60/40 to 85/15, and a molded product thereof and a process of manufacturing a car exterior material.

25 Claims, 1 Drawing Sheet

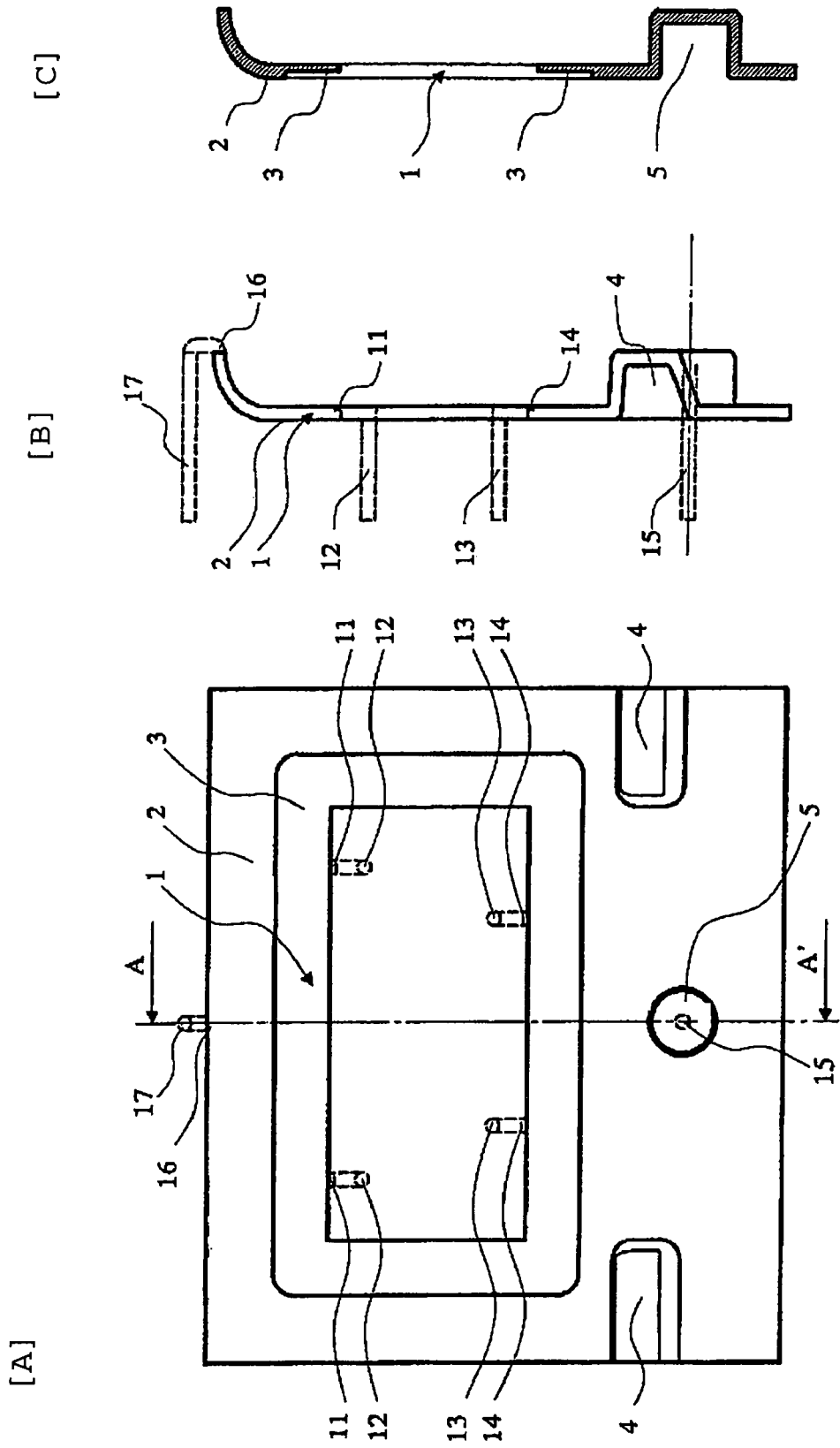

RESIN COMPOSITION

TECHNICAL FIELD

The present invention relates to a resin composition comprising an aromatic polycarbonate (may be referred to as "PC" hereinafter) and polyethylene terephthalate (may be referred to as "PET" hereinafter). The present invention also relates to a molded product of the composition such as a car exterior material and a process of manufacturing a car exterior material.

BACKGROUND ART

Parts used in automobiles and OA equipment are becoming thinner and lighter rapidly. For example, attempts are being made in the automobile industry to manufacture large-sized parts typified by body panels such as a fender from resin compositions in order to reduce the weight of an automobile.

One of the resin compositions used in automobiles and OA equipment is a resin composition which comprises PC and PET (may be referred to as "PC/PET alloy" hereinafter). Since the PC/PET alloy has both the characteristic properties such as high impact resistance and stiffness of PC and the characteristic properties such as high chemical resistance of PET, it is a useful resin composition and various improvements on the composition are proposed.

For example, patent document 1 discloses a car side protector which is manufactured by injection molding a resin composition comprising PC, PET, an impact improving material and mica. The resin composition is obtained by making use of impact resistance and heat resistance which are the advantages of PC and improving the chemical resistance which is the weak point of PC with PET. However, the fluidity of the resin composition has room for improvement and a trouble may occur when a large-sized part is molded.

Patent document 2 proposes a resin composition which comprises PC and recycled PET. Although the resin composition has advantages such as impact resistance, stiffness and heat resistance derived from PC, the fluidity of the resin composition must be improved in order to mold a large-sized, thin and lightweight part. Since the resin composition comprises the recycled PET, it is unsatisfactory in terms of heat stability.

Like the above documents, various proposals have been made to improve the physical properties of a resin composition which essentially comprises PC and an aromatic polyester such as PET. For instance, patent document 3 discloses a resin composition which comprises PC, an aromatic polyester, a rubber-like elastic material and fine fibers surface treated with a silane-based compound to improve weld strength, stiffness and impact resistance. Patent document 4 discloses a resin composition which comprises PC, an aromatic polyester, wollastonite, an ethylene-ethyl acrylate copolymer and a copolymer wax of an α-olefin and maleic anhydride. The proposal of this document aims to improve the surface appearance, chemical resistance, impact resistance and stiffness of a molded product. Further, patent document 5 discloses a resin composition which comprises PC, an aromatic polyester and wollastonite having a specific shape. The proposal of this document aims to improve the impact resistance, recyclability and surface appearance of the resin composition. In addition, patent document 6 discloses a large-sized molded product obtained by injection compression molding a resin composition which comprises PC and an aromatic polyester. The proposal of this document aims to improve the dimensional stability and impact strength of the resin composition.

However, all of the above proposals aim to improve mechanical properties such as impact resistance and stiffness and thermal properties such as heat resistance, and the fluidity of a resin composition required to mold a large-sized thin part is not studied to the full.

As technology for improving the fluidity of a resin composition, patent document 7 discloses a resin composition which comprises a low-molecular weight polybutylene terephthalate, a high-molecular weight polyester and a specific phosphorus-containing compound. However, this technology cannot be applied to the PC/PET alloy which differs from the above resin composition in resin component. The resin composition has room for improvement in stiffness, impact resistance and heat resistance.

As a resin composition for car parts, patent document 8 discloses a resin composition which comprises PC, ABS and talc and has a specific linear thermal expansion coefficient, specific dart impact strength and a specific deflection temperature under load.

Although a large number of proposals have been made to improve the impact resistance, stiffness, heat resistance and heat stability of the PC/PET alloy as described above, a resin composition which has fluidity required for molding a large-sized part which must be thin and lightweight and chemical resistance required for molding a part which must have a stable coating appearance has not been proposed yet.

Meanwhile, sequential valve gating (to be referred to as "SVG method" hereinafter) for opening or closing a plurality of hot runner valves sequentially according to a program is suitable for the manufacture of large-sized molded products such as car parts (refer to non-patent document 1). Although SVG method may be used to mold a plurality of molded products having different shapes from a plurality of gates, when one molded product is molded from a plurality of gates, a high-quality large-sized resin molded product is obtained. In the latter case, after a molten resin from the previous gate passes, the gate is opened to fill a resin by carrying it on a flow of the molten resin. SVG method molding is generally called "cascade molding" in which the above operation is carried out stepwise by each gate to supply the molten resin. Since this cascade molding can suppress a weld line and increases the degree of freedom of the number of gates, it has an advantage that a large-sized molded product can be injection molded with relatively low clamping force. Therefore, a resin composition having excellent fluidity suitable for this molding method is desired.

(patent document 1) JP-A 4-224920
(patent document 2) JP-A 2003-128905
(patent document 3) JP-A 8-259789
(patent document 4) JP-A 9-012847
(patent document 5) JP-A 2002-265769
(patent document 6) JP-A 2003-171564
(patent document 7) JP-A 6-279664
(patent document 8) JP-A 2-294358
(non-patent document 1) Plastics Technology, December 2003, p. 38

DISCLOSURE OF THE INVENTION

In order to mold parts which must be thin and lightweight, such as car parts and OA equipment parts, a resin composition must have high fluidity. Molded products which need to have a good appearance are generally coated. High chemical resistance to an organic solvent such as a thinner contained in a coating material is needed to achieve a stable coating appearance. At the same time, high stiffness, impact resistance, heat resistance and heat stability are required in many cases.

It is therefore an object of the present invention to provide a resin composition which has high chemical resistance while retaining high fluidity, is excellent in impact resistance, heat resistance, stiffness and heat stability, and comprises PC and PET as the main components. It is another object of the present invention to provide a molded product of the composition, such as a car exterior material. It is a further object of the present invention to provide a process of manufacturing a car exterior material.

In general, to improve the fluidity of a resin composition, the molecular weight of the constituent resin must be reduced. However, when the molecular weight of the resin is reduced, mechanical properties and thermal properties such as impact resistance, stiffness and heat resistance deteriorate. Meanwhile, to improve the chemical resistance of a PC/PET alloy, the content of PET which is superior in chemical resistance to PC must be increased. However, when the content of PET is increased, mechanical properties and thermal properties such as impact resistance and heat resistance deteriorate.

Then, the inventors of the present invention have studied the method of improving the fluidity of a PC/PET alloy while suppressing the deterioration of impact resistance, stiffness, heat resistance and heat stability. As a result, they have found that when novel low-viscosity PET is used as the PET component of the PC/PET alloy, fluidity can be improved without deteriorating physical properties such as impact resistance, heat resistance, stiffness and heat stability. The present invention has been accomplished based on this finding. Surprisingly, the inventors of the present invention have found that when the low-viscosity PET is used, chemical resistance can be improved without increasing the content of PET. Further, the inventors of the present invention have discovered that when a resin composition comprising the low-viscosity PET is molded by SVG method, a car exterior material having impact resistance, a low linear thermal expansion coefficient and an excellent appearance (especially coating appearance) can be obtained. The present invention has been accomplished based on this finding.

That is, the present invention is a resin composition comprising 50 to 100 wt % of a resin component and 0 to 50 wt % of an inorganic filler (component D), wherein the resin component is composed of (i) an aromatic polycarbonate (component A) having a viscosity average molecular weight of 16,000 to 23,000 and (ii) polyethylene terephthalate (component B) having an intrinsic viscosity (IV) of 0.45 to 0.57 dl/g, a terminal carboxyl group content of 20 to 35 eq/ton and a ratio (Mw/Mn) of weight average molecular weight (Mw) to number average molecular weight (Mn) of 1.3 to 2.1, and (iii) the weight ratio {(A+D)/B} of the total of the components A and D to the component B is 60/40 to 85/15. The present invention includes a molded product of the resin composition. The present invention also includes a car exterior material which is a molded product of the resin composition.

Further, the present invention is a process of manufacturing a car exterior material by injection molding a resin composition in a mold, wherein (i) the mold has (i-1) a gate-A and a gate-B, (i-2) the gate-B is supplied with a molten resin so that it joins a flow of a molten resin flowing in from another gate after it passes therethrough and the gate-A is supplied with a molten resin without joining the flow of the molten resin; and (i-3) the gates in the mold are each installed in an area having a linear distance of at least 20 cm on the surface of the exterior material where other gates are not existent;

(ii) the car exterior material is mainly composed of (ii-1) a design surface on any one of the front and rear surfaces and a portion which does not require a design and is selected from the group consisting of a recess from the design surface and a through portion having no surface; and (iii) the resin composition comprises (iii-1) 50 to 100 wt % of a resin component and 0 to 50 wt % of an inorganic filler (component D), the resin component is composed of (iii-2) an aromatic polycarbonate (component A) having a viscosity average molecular weight of 16,000 to 23,000 and (iii-3) polyethylene terephthalate (component B) having an intrinsic viscosity (IV) of 0.45 to 0.57 dl/g, a terminal carboxyl group content of 20 to 35 eq/ton and a ratio (Mw/Mn) of weight average molecular weight (Mw) to number average molecular weight (Mn) of 1.3 to 2.1, and (iii-4) the weight ratio {(A+D)/B} of the total of the components A and D to the component B is 60/40 to 85/15.

The intrinsic viscosity of PET used in the present invention is much lower than the intrinsic viscosity of PET used in an ordinary PC/PET alloy. That is, the intrinsic viscosity of PET used in the ordinary PC/PET alloy is about 0.65 to 1.5 dl/g whereas the intrinsic viscosity of PET used in the present invention is 0.45 to 0.57 dl/g. In general, PET whose degree of polymerization has been increased by the solid-phase polymerization of PET obtained by a polycondensation reaction is used in the manufacture of a molded product. However, PET having low intrinsic viscosity before solid-phase polymerization is preferably used as the component B in the present invention.

BRIEF DESCRIPTION OF THE DRAWING

FIG. 1 are front view ([A]), a side view ([B]) and a sectional view ([C]) on the axis A-A' of a car exterior material manufactured in Example.

EXPLANATIONS OF LETTERS OR NOTATIONS 1 car exterior material body (projection length in longitudinal direction: 850 mm, projection length in transverse direction: 1,000 mm, thickness: 4.5 mm)

2 design surface 3 window mounting portion (non-design surface)

4 depressed portion for installing lamp fitting 5 depressed portion for installing grip 11 in-frame upper gate 12 sprue connected to gate 11 (the end of the sprue is connected to a hot runner valve)

13 in-frame lower gate 14 sprue connected to gate 13 (the end of the sprue is connected to a hot runner valve)

15 gate of depressed portion for installing grip (direct gate situated on the axis of bilateral symmetry and the end of the gate is connected to a hot runner valve)

16 gate at the top of molded product (situated on the axis of bilateral symmetry)

17 sprue connected to gate 16 (the end of the sprue is connected to a hot runner valve)

BEST MODE FOR CARRYING OUT THE INVENTION

Resin Composition (Component A: PC)

PC as the component A is obtained by reacting a diphenol with a carbonate precursor. The reaction may be interfacial polycondensation method, melt ester interchange, the solid-phase ester interchange method of a carbonate prepolymer or the ring-opening polymerization method of a cyclic carbonate compound.

Examples of the diphenol include 2,2-bis(4-hydroxyphenyl)propane (commonly called "bisphenol A"), 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane and α,α'-bis(4-hydroxyphenyl)-m-diisopropylbenzene. They may be used alone or in combination of two or more.

Since the component A is preferably a bisphenol A type PC manufactured from a diphenol which is substantially bisphenol A. That is, the diphenol is desirably a bisphenol A type PC manufactured by using preferably 90 to 100 mol %, more preferably 95 to 100 mol % of bisphenol A.

As the carbonate precursor is used a carbonyl halide, carbonate ester or haloformate, as exemplified by phosgene, diphenyl carbonate or dihaloformate of a diphenol.

The component A may be PC having high heat resistance or low water absorption polymerized by using another diphenol besides the bisphenol A type PC. The PC may be manufactured by any process. In the case of interfacial polycondensation, a monophenol terminal capping agent is generally used. The PC may be a branched PC obtained by polymerizing a trifunctional phenol or a co-PC obtained by copolymerizing an aliphatic dicarboxylic acid, aromatic dicarboxylic acid, or divalent aliphatic or alicyclic alcohol. However, a PC which is a homopolymer of bisphenol A is particularly preferred because it has excellent impact resistance. As for the details of the component A, refer to the pamphlet of WO03/080728.

Preferred examples of the PC having high heat resistance or low water absorption polymerized by using another diphenol are given below.

(1) co-PC comprising preferably 20 to 80 mol %, more preferably 40 to 75 mol %, much more preferably 45 to 65% of 4,4'-(m-phenylenediisopropylidene)diphenol (to be abbreviated as "BPM" hereinafter) and preferably 20 to 80 mol %, more preferably 25 to 60 mol %, much more preferably 35 to 55 mol % of 9,9-bis(4-hydroxy-3-methylphenyl)fluorene (to be abbreviated as "BCF" hereinafter) based on 100 mol % of the diphenol component constituting the PC (2) co-PC comprising preferably 10 to 95 mol %, more preferably 50 to 90%, much more preferably 60 to 85 mol % of bisphenol A and preferably 5 to 90 mol %, more preferably 10 to 50 mol %, much more preferably 15 to 40 mol % of BCF based on 100 mol % of the diphenol component constituting the PC (3) co-PC comprising preferably 20 to 80 mol %, more preferably 40 to 75 mol %, much more preferably 45 to 65 mol % of BPM and preferably 20 to 80 mol %, more preferably 25 to 60 mol %, much more preferably 35 to 55 mol % of 1,1-bis(4-hydroxyphenyl)-3,3,5-trimethylcyclohexane based on 100 mol % of the diphenol component constituting the PC These special PCs may be used alone or in combination of two or more. Or, they may be mixed with a commonly used bisphenol A' type PC before use.

The manufacturing processes and characteristics properties of these special PC's are described in detail, for example, by JP-A 6-172508, JP-A 8-27370, JP-A 2001-55435 and JP-A 2002-117580.

As the component A may be used not only a virgin raw material but also PC recycled from used products, i.e., so-called "material recycled PC". The preferred used products include glazing materials typified by sound barriers, glass windows, light transmitting roof materials and car sun roofs, transparent members such as windshields and car head lamp lenses, containers such as water bottles, and optical recording media. They do not contain large amounts of additives and other resins and target quality can be obtained stably. Car head lamp lenses and optical recording media are particularly preferred because they are consumed in large quantities and recycled materials are obtained stably. The above virgin raw material is a raw material which is not used in the market yet after it is manufactured.

The viscosity average molecular weight of the component A is 16,000 to 23,000, preferably 16,000 to 22,000, more preferably 18,000 to 21,000. PC having a viscosity average molecular weight within the above preferred range is excellent in balance among fluidity, strength and heat resistance.

The above viscosity average molecular weight may be achieved by the entire component A or a mixture of two or more having different molecular weights. Mixing of PC having a viscosity average molecular weight of preferably 50,000, more preferably 80,000 or more, much more preferably 100,000 or more may be advantageous in enhancing entropy elasticity at the time of melting. For example, it is effective in suppressing jetting and improving gas injection moldability, foam moldability (including foam moldability by a super critical fluid) or injection press moldability. Therefore, mixing of PC having a viscosity average molecular weight of 50,000 or more is one of preferred options when the improvement of the above moldability is desired and when these molding methods are employed. Although the above effect becomes more marked as the molecular weight of PC increases, the upper limit of the molecular weight is practically preferably 2,000,000, more preferably 300,000, much more preferably 200,000. As for mixing of the above high-molecular weight component, the component is preferably used in an amount that a molecular weight distribution having two or more peaks can be observed by a measuring method such as GPC (Gel Permeation Chromatography).

The phenolic hydroxyl group content of PC (component A) is preferably 30 eq/ton or less, more preferably 25 eq/ton or less, much more preferably 20 eq/ton or less. This value can be lowered substantially to 0 eq/ton by reacting the terminal capping agent completely. The content of the phenolic hydroxyl group is obtained by measuring the molar ratio of a diphenol unit having a carbonate bond, a diphenol unit having a phenolic hydroxyl group and the unit of the terminal capping agent by $^1$H-NMR and calculating the amount of the phenolic hydroxyl group based on the weight of the polymer.

As for the viscosity average molecular weight in the present invention, a specific viscosity calculated from the following equation is first obtained from a solution containing 0.7 g of PC dissolved in 100 ml of methylene chloride at 20° C. by using an Ostwald's viscometer, and a viscosity average molecular weight M is obtained by inserting the obtained specific viscosity into the following equation.

$$\text{Specific viscosity } (\eta_{sp}) = (t - t_0)/t_0$$

[$t_0$ is the number of seconds during which methylene chloride drops and t is the number of seconds during which the sample solution drops]

$$\eta_{sp}/c = [\eta] + 0.45 \times [\eta]^2 c \text{ ([\eta] is an intrinsic viscosity)}$$

$$[\eta] = 1.23 \times 10^{-4} M^{0.83}$$

$$c = 0.7$$

(Component B: PET)

PET (component B) comprises terephthalic acid as the main dicarboxylic acid component. PET may comprise a dicarboxylic acid component other than terephthalic acid component as a comonomer. That is, PET comprises preferably 70 to 100 mol %, more preferably 80 to 100 mol %, much more preferably 90 to 100 mol % of terephthalic acid based on 100 mol % of the total of all the dicarboxylic acid components. The expression "aa component" ("aa" denotes the name of a compound) related to the constituent unit of the component B denotes the compound "aa" or a polymer constituent unit derived from its ester forming derivative. For example, the expression "dicarboxylic acid component" denotes a dicarboxylic acid or a constituent unit derived from its ester forming derivative.

Examples of the other dicarboxylic acid component include constituent units derived from isophthalic acid, 2-chloroterephthalic acid, 2,5-dichloroterephthalic acid, 2-methylterephthalic acid, 4,4-stilbenedicarboxylic acid, 4,4-biphenyldicarboxylic acid, orthophthalic acid, 2,6-naphthalenedicarboxylic acid, 2,7-naphthalenedicarboxylic acid, bisbenzoic acid, bis(p-carboxyphenyl)methane, anthracenedicarboxylic acid, 4,4-diphenylether dicarboxylic acid, 4,4-diphenoxyethanedicarboxylic acid, 5-Na sulfoisophthalic acid and ethylene-bis-p-benzoic acid. These dicarboxylic acid components may be used alone or in combination of two or more. The amount of the other dicarboxylic acid component is preferably 0 to 30 mol %, more preferably 0 to 20 mol %, much more preferably 0 to 10 mol % based on 100 mol % of the total of all the dicarboxylic acid components.

The component B may be a copolymer, further comprising less than 30 mol % of an aliphatic dicarboxylic acid component in addition to the above aromatic dicarboxylic acids. Examples of the component include constituent units derived from adipic acid, sebacic acid, azelaic acid, dodecanedioic acid, 1,3-cyclohexanedicarboxylic acid and 1,4-cyclohexanedicarboxylic acid.

PET may comprise a diol component other than an ethylene glycol component as a comonomer. PET comprises preferably 70 to 100 mol %, more preferably 80 to 100 mol %, much more preferably 90 to 100 mol % of the ethylene glycol component based on 100 mol % of the total of all the diol components.

Examples of the other diol component include constituent units derived from diethylene glycol, 1,2-propylene glycol, 1,3-propanediol, 2,2-dimethyl-1,3-propanediol, trans- or -2,2,4,4-tetramethyl-1,3-cyclobutanediol, 1,4-butanediol, neopentyl glycol, 1,5-pentanediol, 1,6-hexanediol, 1,4-cyclohexanedimethanol, 1,3-cyclohexanedimethanol, decamethylene glycol, cyclohexanediol, p-xylenediol, bisphenol A, tetrabromobisphenol A and tetrabromobisphenol A-bis(2-hydroxyethyl ether). They may be used alone or in combination of two or more. The amount of the other diol component is preferably 0 to 30 mol %, more preferably 0 to 20 mol %, much more preferably 0 to 10 mol % based on 100 mol % of the total of all the diol components.

Polyethylene terephthalate containing a small amount of a polyethylene glycol component as a diol component may also be used. The molecular weight of the polyethylene glycol component is preferably 150 to 6,000.

The amount of the polyethylene glycol component is preferably 5 wt % or less, more preferably 3 wt % or less, much more preferably 2 wt % or less based on 100 wt % of the diol component. The lower limit of the amount is preferably 0.5 wt %, more preferably 1 wt %.

The component B further contains about 0.5 mol % or more of a diethylene glycol component based on 100 mol % of the diol component as a side-reaction product produced by polymerization. The amount of the diethylene glycol component is preferably 6 mol % or less, more preferably 5 mol % or less.

As for the ratio of a terephthalic acid component to an isophthalic acid component in the polyethylene terephthalate/isophthalate copolymer (may be abbreviated as "TA/IA copolymer" hereinafter) comprising the isophthalic acid component as part of the terephthalic acid component in the component B, the amount of the terephthalic acid component is 70 to 99.9 mol %, preferably 75 to 99 mol %, more preferably 80 to 99 mol % based on 100 mol % of the total of all the dicarboxylic acid components. The amount of the isophthalic acid component is 0.1 to 30 mol %, preferably 1 to 25 mol %, more preferably 1 to 20 mol %.

Further, this TA/IA copolymer may contain 10 mol % or less, preferably 5 mol % or less of the above aromatic dicarboxylic acid component such as naphthalenedicarboxylic acid and 5 mol % or less, preferably 3 mol % or less of the above aliphatic dicarboxylic acid component such as adipic acid other than the terephthalic acid component and the isophthalic acid component. It is most preferred that the component B should consist of the terephthalic acid component and the isophthalic acid component as dicarboxylic acid components. Although the ethylene glycol component is the most preferred as the sole diol component in the TA/IA copolymer, a diol component other than ethylene glycol may also be copolymerized.

As for the ratio of an ethylene glycol component to a neopentyl glycol component in a polyethylene/neopentyl terephthalate copolymer (may be abbreviated as "EG/NPG copolymer" hereinafter) which comprises the neopentyl glycol component as part of the ethylene glycol component in the component B, the amount of the ethylene glycol component is 90 to 99 mol %, preferably 95 to 99 mol %, more preferably 97 to 99 mol % based on 100 mol % of the total of all the diol components. The amount of the neopentyl glycol component is 1 to 10 mol %, preferably 1 to 8 mol %, much more preferably 1 to 5 mol %. A diol component other than ethylene glycol and neopentyl glycol may also be copolymerized.

The above aromatic dicarboxylic acid component other than the terephthalic acid component such as isophthalic acid or naphthalenedicarboxylic acid may be copolymerized in an amount of 10 mol % or less, preferably 5 mol % or less and the above aliphatic dicarboxylic acid component such as adipic acid may be copolymerized in an amount of 5 mol % or less, preferably 3 mol % or less in this EG/NPG copolymer. It is most preferred that terephthalic acid component should be copolymerized as the sole dicarboxylic acid component. An aliphatic dicarboxylic acid component may also be copolymerized.

The component B can be manufactured by polymerizing a compound which induces a dicarboxylic acid component and a compound which induces the above diol component under heating in the presence of a polycondensation catalyst containing titanium, germanium or antimony and discharging the by-produced water or lower alcohol to the outside of the system in accordance with a commonly used method. The polycondensation catalyst is preferably a germanium-based polymerization catalyst. Examples of the germanium-based polymerization catalyst include oxides, hydroxides, halides, alcoholates and phenolates of germanium such as germanium dioxide, germanium hydroxide, germanium tetrachloride and tetramethoxy germanium. A non-soluble catalyst such as antimony trioxide may also be used. Particularly when PET obtained by polymerization in the presence of a germanium-based polymerization catalyst is used, chemical resistance and heat stability become high.

In the present invention, a conventionally known manganese, zinc, calcium or magnesium compound which is used in an ester interchange reaction before polycondensation may be used in combination, and polycondensation can be carried out by deactivating the above catalyst with a phosphoric acid or phosphorous acid compound after the end of the above ester interchange reaction. PET may be manufactured by a batch or continuous polymerization process.

The component B has a lower intrinsic viscosity than that of PET used in an ordinary PC/PET alloy. That is, the intrinsic viscosity (IV) of the component B is 0.45 to 0.57 dl/g, preferably 0.47 to 0.55 dl/g, more preferably 0.49 to 0.52 dl/g. When IV is large, fluidity lowers and the effect of improving chemical resistance is hardly obtained. When IV is too small, a reduction in strength becomes large and the heat stability of a thermoplastic resin is reduced by the influence of a high terminal group content of PET. The manufacture of PET having a small IV involves a problem that pelletization is difficult because its thread is broken.

The intrinsic viscosity (IV) of the component B is a value measured in o-chlorophenol at 25° C. That is, after 1.2 g of PET is dissolved in 15 cm$^3$ of o-chlorophenol by heating, it is cooled to measure the viscosity of the solution at 25° C. The density of PET obtained after the polycondensation reaction step is preferably 1.35 to 1.41 g/cm$^3$, more preferably 1.37 to 1.39 g/cm$^3$. In the present invention, the density of PET is measured at 23° C. by a density gradient tube method using a calcium nitrate solution in accordance with the method D of JIS K7112.

In general, PET whose degree of polymerization has been increased by the solid-phase polymerization of PET obtained by the polycondensation reaction is used in the manufacture of a molded product. However, in the present invention, PET having a low degree of polymerization which is not solid-phase polymerized may be used as the component B.

The component B has a ratio (Mw/Mn) of weight average molecular weight (Mw) to number average molecular weight (Mn) of 1.3 to 2.1, preferably 1.5 to 2.1, more preferably 1.7 to 2.0.

Mw/Mn can be obtained by GPC (Gel Permeation Chromatography). That is, a PET sample is dissolved in a mixed solution of chloroform and hexafluoroisopropanol in a volume ratio of 1:1 by using a GPC measuring instrument placed in a clean air environment at a temperature of 23° C. and a relative humidity of 50%, the MIXED-C column (length of 300 mm, inner diameter of 7.5 mm) of Polymer Laboratories Co., Ltd., chloroform as a moving phase, the EG CAL PS-2 of Polymer Laboratories Co., Ltd. as a standard reference, a UV detector (wavelength of 254 nm) as a detector and chloroform as a developing solvent, the resulting solution is diluted with chloroform to obtain a solution having a concentration of 0.3 mg/ml, and 100 μl of the resulting diluted solution is injected into the GPC measuring instrument to carry out GPC measurement under such conditions as a column temperature of 35° C. and a flow rate of 1 ml/min so as to calculate the number average molecular weight (Mn), weight average molecular weight (Mw) and Mw/Mn of the sample. Fine peaks derived from unreacted monomers and impurities seen in a low molecular weight area are excluded from the GPC measurement peaks and only the main peak derived from a polymer is used for calculation.

Recycled PET is re-used in resin compositions these days. Since the recycled PET may have a large Mw/Mn, care must be taken when it is used as the component B in the present invention. The component B has a terminal carboxyl group content of 20 to 35 eq/ton, preferably 22 to 30 eq/ton, more preferably 23 to 28 eq/ton.

The component B has a dioxyethylene terephthalate unit content of preferably 1.0 to 5.0 mol %, more preferably 1.0 to 2.5 mol %. PET obtained by the polycondensation reaction is formed into chips by melt extrusion molding. The PET chips have an average diameter of preferably 2 to 5 mm, more preferably 2.2 to 4 mm. The PET chips obtained through the liquid-phase polycondensation step are preferably used directly.

(Component C: Rubber-Like Polymer)

The rubber-like polymer as the component C is a polymer which comprises a rubber component having a glass transition temperature of preferably 10° C. or lower, more preferably −10° C. or lower, much more preferably −30° C. or lower, or a copolymer having another polymer chain bonded to the polymer comprising a rubber component. It is also a polymer which comprises the rubber component in an amount of preferably 35 wt % or more, more preferably 45 wt % or more based on 100 wt % of the rubber-like polymer. The upper limit of the content of the rubber component is suitably about 90 wt % for practical use.

The rubber-like polymer is more preferably a copolymer having another polymer chain bonded thereto. In the manufacture of a rubber-like polymer having another polymer chain graft bonded to a rubber component, it is widely known that a polymer or a copolymer not graft bonded to the rubber component is produced to no small extent. The component C of the present invention may contain this free polymer or copolymer.

Examples of the rubber-like polymer as the component C include SB (styrene-butadiene) copolymer, ABS (acrylonitrile-butadiene-styrene) copolymer, MBS (methyl methacrylate-butadiene-styrene) copolymer, MABS (methyl methacrylate-acrylonitrile-butadiene-styrene) copolymer, MB (methyl methacrylate-butadiene) copolymer, ASA (acrylonitrile-styrene-acrylic rubber) copolymer, AES (acrylonitrile-ethylene propylene rubber-styrene) copolymer, MA (methyl methacrylate-acrylic rubber) copolymer, MAS (methyl methacrylate-acrylic rubber-styrene) copolymer, methyl methacrylate-acryl•butadiene rubber copolymer, methyl methacrylate-acryl•butadiene rubber-styrene copolymer, and methyl methacrylate-(acryl•silicone IPN rubber) copolymer. These copolymers are preferably core-shell type graft copolymers having a core of a polymer comprising a rubber component bonded to a polymer chain comprising the above monomer. Out of these, at least one rubber-like polymer selected from the group consisting of styrene-butadiene copolymer, acrylonitrile-butadiene-styrene copolymer, methyl methacrylate-butadiene-styrene copolymer and methyl methacrylate-(acryl•silicone IPN rubber) copolymer is preferred.

The rubber particle diameter of the rubber-like polymer is preferably 0.05 to 2 μm, more preferably 0.1 to 1 μm, particularly preferably 0.1 to 0.5 μm in terms of weight average particle diameter. The distribution of rubber particle diameters may be a distribution having a single mountain or a distribution having two or more mountains, and the rubber particles may have a single phase at their morphology or a salami structure containing an occluded phase around rubber particles.

In the rubber-like polymer which is a graft copolymer, the weight ratio (graft ratio (wt %)) of the grafted component to the rubber substrate is preferably 10 to 100%, more preferably 15 to 70%, much more preferably 15 to 40%.

The rubber-like polymer is, for example, a thermoplastic elastomer composed of a hard segment and a soft segment. Examples of the thermoplastic elastomer include polyester elastomers, polyurethane elastomers, styrene-based elastomers and olefin-based elastomers.

(Component D: Inorganic Filler)

The inorganic filler as the component D of the present invention may be flaky, fibrous, spherical or hollow. A flaky filler and/or a fibrous filler are/is preferred from the viewpoints of the improvement of the strength and impact resistance of the resin composition and dimensional stability. The inorganic filler (component D) may be surface treated with a silane coupling agent (including alkylalkoxysilane or polyorganohydrogen siloxane), higher fatty acid ester, acid compound (such as phosphorous acid, phosphoric acid, carboxylic acid or carboxylic anhydride) or surface treatment agents such as wax. Further, it may be granulated with a greige agent such as a resin, higher fatty acid ester or wax to be granular.

(Flaky Filler)

Examples of the flaky filler include glass flakes, metal flakes, graphite flakes, smectite, kaolin clay, mica and talc. A hollow filler such as glass balloon may have the effect of improving stiffness like a lamellar inorganic filler when it is melt kneaded with a resin to be ground. The flaky filler includes what exhibits the above effect. These inorganic fillers include what covers the surface of another material. Typical examples of the another material include metals, alloys and metal oxides. The coverage of a metal or alloy can provide high conductivity and may improve design. The coverage of a metal oxide may provide a function such as photoconductivity and can improve design.

The flaky filler has an average particle diameter (D50 (median diameter of a particle size distribution)) measured by a laser diffraction/scattering method of preferably 0.1 to 50 µm, more preferably 0.3 to 30 µm, much more preferably 0.5 to 10 µm. The average particle thickness is preferably 0.01 to 1 µm, more preferably 0.01 to 0.8 µm, much more preferably 0.05 to 0.5 µm.

(Mica)

Mica has an average particle diameter (D50 (median diameter of a particle size distribution)) measured by the laser diffraction/scattering method of preferably 1 to 50 µm, more preferably 2 to 20 µm, much more preferably 2 to 10 µm. When the average particle diameter of mica is smaller than 1 µm, the effect of improving stiffness becomes unsatisfactory and even when the average particle diameter is larger than 50 µm, the improvement of stiffness becomes unsatisfactory and a reduction in mechanical strength such as impact resistance is marked disadvantageously. The thickness of mica actually measured by observation through an electronic microscope is preferably 0.01 to 1 µm, more preferably 0.03 to 0.3 µm. The aspect ratio of mica is preferably 5 to 200, more preferably 10 to 100. Mica may be a ground product of natural mineral or a synthesized product. Mica may be manufactured by a dry grinding process or a wet grinding process. Although the dry grinding process is inexpensive and common, the wet grinding process is effective in grinding mica more finely and thinly. As a result, its effect of improving the stiffness of the resin composition is enhanced.

(Talc)

Talc is hydrous magnesium silicate which is generally represented by a chemical formula $4SiO_2 \cdot 3MgO \cdot 2H_2O$ and flaky particles having a laminar structure. Talc comprises 56 to 65 wt % of $SiO_2$, 28 to 35 wt % of MgO and about 5 wt % of $H_2O$. As other trace components, it contains 0.03 to 1.2 wt % of $Fe_2O_3$, 0.05 to 1.5 wt % of $Al_2O_3$, 0.05 to 1.2 wt % of CaO, 0.2 wt % or less of $K_2O$ and 0.2 wt % or less of $Na_2O$. As preferred composition, it comprises 62 to 63.5 wt % of $SiO_2$, 31 to 32.5 wt % of MgO, 0.03 to 0.15 wt % of $Fe_2O_3$, 0.05 to 0.25 wt % of $Al_2O_3$ and 0.05 to 0.25 wt % of CaO. It preferably has an ignition loss of 2 to 5.5 wt %.

The average particle diameter of talc measured by a precipitation method is preferably 0.1 to 50 µm, more preferably 0.1 to 10 µm, much more preferably 0.2 to 5 µm, particularly preferably 0.2 to 3.5 µm. Talc having a bulk density of 0.5 g/cm$^3$ is preferred. The average particle diameter of talc is called "D50" (median diameter of a particle size distribution) measured by an X-ray transmission method which is one of liquid-phase sedimentation methods. An example of the instrument for measuring the average particle diameter is the Sedigraph5100 of Micromeritics Co., Ltd.

The method of manufacturing talc by grinding an ore is not particularly limited, and axial flow milling, annular milling, roll milling, ball milling, jet milling and container revolving compression shear milling may be employed. Talc which has been classified by a classifier to be uniform in particle size after grinding is preferred. The classifier is not particularly limited, and impactor type inertia force classifiers (such as variable impactor), Coanda effect-use inertia force classifiers (such as elbow jet) and centrifugal classifiers (such as multistage cyclone, microplex, dispersion separator, acucut, turbo classifier, turboplex, micron separator and super separator) may be used.

Further, talc in an agglomerated state is preferred from the viewpoint of handling ease. To manufacture talc in the agglomerated state, a method in which deaeration compression is used and a method in which a greige agent is used for compression are employed. The method making use of deaeration compression is particularly preferred because it is simple and prevents the unwanted greige agent resin component from being contained in the resin composition of the present invention.

(Fibrous Filler)

The fibrous filler has an average fiber diameter of preferably 0.1 to 30 µm, more preferably 0.1 to 20 µm, much more preferably 0.5 to 15 µm. The average fiber length of the fibrous filler is preferably 1 to 500 µm, more preferably 1 to 400 µm, much more preferably 5 to 350 µm.

As for the average fiber diameter, reinforced fillers are observed through an electron microscope to obtain the fiber diameter of each filler so as to calculate the number average fiber diameter from the measurement values. The reason for the use of the electron microscope is that it is difficult to measure the fiber diameter of each filler to be measured accurately with an optical microscope. Fillers to be measured for the fiber diameter are extracted at random from an image obtained by observing through the electron microscope and their fiber diameters are measured at positions close to the center portions of the fillers to calculate the number average fiber diameter from the obtained measurement values. The magnification of the microscope is about 1,000×, and the number of fillers to be measured is 500 or more (600 or less is preferred for work efficiency).

As for the average fiber length, the fillers are observed through an optical microscope to obtain the length of each filler so as to calculate the number average fiber length from the measurement values. For observation through the optical microscope, a sample in which fillers are dispersed well and not overlapped with one another is first prepared. Observation is carried out with a 20-power objective lens, and this observed image is picked up as image data by a CCD camera having about 250,000 pixels. The fiber length is calculated from the obtained image data by using an image analyzing apparatus and a program for obtaining the maximum distance between two points of the image data. Under the conditions, the size of each pixel is equivalent to a length of 1.25 μm, and the number of the measured fillers is 500 or more (600 or less is preferred for work efficiency).

Examples of the fibrous filler include glass fibers, carbon fibers, metal fibers, ceramic fibers, slag fibers, rock fibers, zonotlite, wollastonite and whiskers (such as potassium titanate whiskers, aluminum borate whiskers, boron whiskers and basic magnesium sulfate whiskers).

(Wollastonite)

The average fiber diameter of wollastonite is preferably 0.1 to 10 μm, more preferably 0.1 to 5 μm, much more preferably 1 to 2 μm. The aspect ratio (average fiber length/average fiber diameter) of wollastonite is preferably 3 to 30, more preferably 5 to 9. The methods of measuring the average fiber diameter and the average fiber length are the same as above.

It is preferred that iron contained in a crude ore and iron contained by the abrasion of equipment when the crude ore is ground be removed as much as possible by a magnetic separator in order to fully reflect the whiteness of wollastonite upon the resin composition. The iron content of wollastonite reduced by the separator is preferably 0.5 wt % or less in terms of $Fe_2O_3$. Wollastonite may be a ground product of a natural mineral or a synthesized product.

(Glass Fibers)

The glass fibers are not limited to particular glass composition such as A glass, C glass or E glass. They may contain such a component as $TiO_2$, $SO_3$ or $P_2O_5$. E glass (alkali-free glass) is more preferred. The glass fibers are manufactured by quenching molten glass while it is stretched by various means to obtain a predetermined fibrous form. The quenching and stretching conditions are not particularly limited. The section of each fiber may be spherical or other shape such as elliptic, cocoon-like or trifoliate-like. Further, a mixture of spherical glass fibers and glass fibers having another shape may also be used.

The average fiber diameter of the glass fibers is not particularly limited but preferably 1 to 25 μm, more preferably 3 to 17 μm, much more preferably 10 to 15 μm. When glass fibers having an average fiber diameter within the above range are used, high heat resistance can be obtained without impairing the appearance of a molded product. The preferred fiber length of the glass reinforcement is preferably 50 to 500 μm, more preferably 100 to 400 μm, much more preferably 230 to 270 μm as the average fiber length in the pellet or molded product of the resin composition of the present invention.

The average fiber length is a value calculated by an image analyzer from the observation of the residue of the glass fibers obtained after a molded product is dissolved in a solvent or a resin is decomposed with a basic compound, through an optical microscope. As for the calculation of this value, fibers having a length smaller than the fiber diameter are not counted. Further, milled fibers having an L/D of 10 or more can be added separately from the above glass fibers in order to reduce anisotropy derived from the glass fibers.

The glass fibers may be coated with a surface coating agent. (i) The surface coating agent preferably contains an epoxy group-containing compound. The epoxy group-containing compound is very reactive with various resins, has the effect of improving adhesion and can exhibit excellent characteristic properties without causing the decomposition reaction of a highly reactive condensation-based polymer. The improvement of adhesion results in the application of great shear force to a polymer existent between glass fibers during molding. Thereby, the crystallinity of a crystalline polymer is enhanced in addition to the reinforcing effect of the fibers with the result that high heat resistance and a reduced time change in size can be achieved.

Although various epoxy group-containing compounds may be used, an epoxy group-containing compound having a polymer structure with a molecular weight of 500 or more and containing a plurality of epoxy groups in the molecule is preferred. A structure essentially composed of an aromatic ring is preferred from the viewpoint of heat resistance.

Preferred examples of the above epoxy group-containing compound include phenol novolak type epoxy resin and linear cresol novolak epoxy resin. Phenol novolak epoxy resin is particularly preferred. That is, epoxy group-containing compounds essentially composed of the phenol novolak epoxy resin and/or the linear cresol novolak epoxy resin are preferred as the epoxy group-containing compound. That is, an epoxy group-containing compound comprising 70 wt % or more, preferably 80 wt % or more, more preferably 90 wt % or more of the phenol novolak epoxy resin and/or the linear cresol novolak epoxy resin is preferred.

(ii) The amount of the surface coating agent is preferably 0.1 to 2 wt %, more preferably 0.5 to 1.5 wt %, much more preferably 0.6 to 1.2 wt % based on 100 wt % of the glass fibers. When the amount of the coating agent is smaller than 0.1 wt %, surface coverage and the convergence of fibers become unsatisfactory. The inconvenience of unsatisfactory convergence will be described hereinafter. When the amount is larger than 2 wt %, adhesion becomes saturated and the greige agent may deteriorate the characteristic properties of the thermoplastic resin.

Preferably, (iii) the glass fibers produce 10 g or less of cotton fly when 200 g of a long chopped strand having a length of 3 mm of the glass fibers is placed in a 1-liter beaker and stirred at 2,000 rpm at 23° C. by a stirrer for 5 minutes. The cotton fly is 30 mesh in size and obtained by opening the converged chopped strand by stirring. The stirrer is preferably a stirrer which indicates revolution and enables the feed-back control of revolution to the set value (that is, the revolution is always kept constant). As for the blades of the stirrer, a three blade marine type stirrer having a diameter of 50 mm is used. The amount of the cotton fly is preferably 5 g or less, more preferably 3 g or less.

In general, the resin composition comprising glass fibers of the present invention can be manufacturing by supplying the glass fibers into a melt kneader. At this point, great external force is applied to the glass fibers as a raw material (1) when they are pre-blended with a raw material resin, (2) transported pneumatically or (3) supplied into the melt kneader independently by using a supplier (of a screw or vibration type) and a side feeder.

In the case of glass fibers which produce a large amount of cotton fly in the above test, when they are supplied into the melt kneader, they may not be supplied stably due to the cotton fly. Further, since the bulk density of the cotton fly is low, they cannot be supplied into the melt kneader and a back flow occurs. These problems cause the irregular residence of the resin in the melt kneader, thereby thermally deteriorating the resin.

Further, even when the glass fibers are supplied into the melt kneader through pneumatic transportation, the cotton fly is produced during transportation and blocks up the transport pipe, thereby making pneumatic transportation impossible. When the amount of the cotton fly is large, the bending of the glass fibers often occurs at the time of melt kneading the thermoplastic resin with the glass fibers, whereby desired characteristic properties such as stiffness and heat resistance may not be obtained.

To achieve the above amount of the cotton fly, a surface coating agent comprising polyurethane, polyacrylate or polyamide in addition to the epoxy group-containing compound is preferably used. Out of these, polyurethane is more preferred. Therefore, a preferred surface coating agent comprises a phenol novolak epoxy resin and/or a linear cresol novolak epoxy resin as the main component and polyurethane. The phenol novolak epoxy resin and/or the linear cresol novolak epoxy resin are/is contained in an amount of preferably 50 to 95 wt %, more preferably 60 to 90 wt % based on 100 wt % of the surface coating agent. Particularly, the phenol novolak epoxy resin is contained in an amount of preferably 50 wt % or more, more preferably 60 wt % or more based on 100 wt % of the binder component.

To coat the glass fibers with the surface coating agent, after the surfaces of the glass fibers are treated with an aminosilane-based coupling agent or an epoxysilane-based coupling agent, they are preferably treated with the phenol novolak epoxy resin and/or the linear cresol novolak epoxy resin and polyurethane. The greige agent for the glass fibers contains a component for providing lubricity or an emulsifier in addition to a component for bundling the fiber reinforcement substantially (surface coating agent). These components may be contained in the greige agent as a matter of course. After an emulsion solution containing these components is applied and dried, a component essentially composed of the surface coating agent remains on the fiber reinforcement. The increase of the molecular weight of the surface coating agent is promoted in the drying and heating steps to form a satisfactory surface coating agent.

Basically, the glass fibers are coated with the phenol novolak epoxy resin and/or the linear cresol novolak epoxy resin and the polyurethane in a solution comprising a mixture of the both emulsions thereof. However, the glass fibers may be coated with these emulsions separately.

In general, the amount of the cotton fly increases when only the phenol novolak epoxy resin is used. However, in the present invention, by adjusting the amount of the epoxy resin and combining it with another greige agent, the surface coating agent has excellent heat resistance and contains a large number of epoxy groups while glass fibers which produce a small amount of the cotton fly can be obtained, thereby reducing the amount of the cotton fly with the result that excellent effects such as heat resistance and dimensional stability can be obtained.

In the present invention, at least one inorganic filler selected from the group consisting of mica, talc, wollastonite and glass fibers is preferred from the viewpoints of impact resistance, appearance, dimensional stability and cost. Wollastonite or glass fibers are particularly preferred.

(Component E: Bending Inhibitor)

The resin composition of the present invention may contain a bending inhibitor in order to suppress the bending or cracking of the inorganic filler (component D) or further improve the heat stability of the resin composition. The bending inhibitor includes (i) a lubricant containing a functional group having reactivity with a silicate mineral and (ii) a lubricant coated with a silicate mineral. A preferred bending inhibitor is an acid group-containing lubricant or alkylalkoxysilane or alkylhydrogensilane having an alkyl group with 60 or less carbon atoms.

The acid group-containing lubricant is preferably a carboxyl group-containing olefin-based wax containing a carboxyl group in an amount of preferably 0.05 to 10 meq/g, more preferably 0.1 to 6 meq/g, much more preferably 0.5 to 4 meq/g based on 1 g of the carboxyl group-containing lubricant. Further, the molecular weight of the olefin-based wax is preferably 1,000 to 10,000. A copolymer of an α-olefin and maleic anhydride which has the above concentration and the above molecular weight is preferred. The copolymer can be manufactured by melt polymerization or bulk polymerization in the presence of a radical catalyst in accordance with a commonly used method. The number of carbon atoms of the α-olefin is preferably 10 to 6.0, more preferably 16 to 60, much more preferably 25 to 55 as an average value.

(Ratio of Components)

The ratio of the components in the present invention will be described below.

The resin composition of the present invention comprises 50 to 100 wt %, preferably 70 to 95 wt %, more preferably 55 to 65 wt % of a resin component and 50 to 0 wt %, preferably 30 to 5 wt %, more preferably 45 to 35 wt % of an inorganic filler (component D).

In the resin composition of the present invention, the weight ratio of the total of PC (component A) and the inorganic filler (component D) to PET (component B), that is, (A+D)/B is 60/40 to 85/15, preferably 65/35 to 85/15, more preferably 65/35 to 80/20.

The weight ratio (A/B) of the component A to the component B is preferably 40/60 to 90/10, more preferably 65/35 to 75/25. When the amount of the component A is small, impact strength and heat resistance may become unsatisfactory and when the amount is large, chemical resistance is hardly obtained.

The amount of the rubber-like polymer (component C) is preferably 1 to 50 parts by weight, more preferably 1 to 10 parts by weight, much more preferably 2 to 7 parts by weight based on 100 parts by weight of the total of the components A and B. When the amount is small, the development of impact strength may become unsatisfactory and when the amount is too large, heat resistance or stiffness lowers.

The amount of the bending inhibitor (component E) is preferably 0.01 to 10 parts by weight, more preferably 0.1 to 5 parts by weight, much more preferably 0.3 to 3 parts by weight based on 100 parts by weight of the total of the components A and B. The suitable amount of the component E which changes according to the content of the component D is preferably 0.05 to 5 parts by weight, more preferably 0.1 to 3 parts by weight, much more preferably 0.1 to 1 part by weight based on 10 parts by weight of the component D.

The melt volume rate (MVR value: unit: $cm^3/10$ min) under a load of 2.16 kg at 280° C. in accordance with ISO1133 standards of the resin composition of the present invention is preferably 10 to 150, more preferably 13 to 150, much more preferably 18 to 100, particularly preferably 20 to 80. When the MVR value is small, satisfactory flow properties cannot be obtained and when the MVR value is too large, impact resistance may be poor.

The resin composition has a flexural modulus (unit: MPa) in accordance with ASTM D-790 of preferably 2,000 to 25,000, more preferably 8,000 to 25,000.

The resin composition has a crack incidence rate in a chemical resistance test of preferably 0 to 20%, more preferably 0 to 10%. The chemical resistance is evaluated based on the number of samples which do not crack when a 0.5% warp is applied to 10 samples prepared in accordance with ASTM D-638 with a 3-point bending jig and the samples are then immersed in gasoline (of Esso Corporation, regular gasoline) at 23° C. for 10 minutes.

The resin composition has a linear expansion coefficient at −30 to 80° C. measured in a flow direction at the center of a sample prepared in accordance with ISO 527-1 of $1.0 \times 10^{-5}$ to $12.0 \times 10^{-5}$/° C. The lower limit of the linear expansion coefficient is preferably $1.2 \times 10^{-5}$/° C. The upper limit of the linear expansion coefficient is preferably $5.5 \times 10^{-5}$/° C., more preferably $3.5 \times 10^{-5}$/° C. When the linear expansion coefficient exceeds the above range, the dimensional change of a molded product by temperature variations in use environment becomes large and the resin composition is not suitable for a car exterior material. When the linear expansion coefficient is small, there is no problem but it is difficult to achieve other characteristic properties, especially the appearance of a molded product as well.

The resin composition has a deflection temperature under a load of 0.45 MPa measured in accordance with ASTM D-648 of 110 to 145° C., preferably 120 to 145° C., particularly preferably 130 to 145° C. When the deflection temperature under load is low, deformation readily occurs at the time of baking the coating. When a load is applied to the resin composition in use environment, for example, under boiling sun, the resin composition greatly warps, thereby reducing the quality of a vehicle.

Preferred examples of the resin composition of the present invention are given below.

(1) A resin composition according to claim 1, comprising 70 to 95 wt % of a resin component and 30 to 5 wt % of wollastonite (component D) having an average fiber diameter of 1 to 2 μm and an aspect ratio of 5 to 9, wherein the resin component is composed of (i) a bisphenol A type aromatic polycarbonate (component A) having a viscosity average molecular weight of 16,000 to 23,000 and (ii) polyethylene terephthalate (component B) having a intrinsic viscosity (IV) of 0.49 to 0.57 dl/g, a terminal carboxyl group content of 23 to 28 eq/ton and a ratio (Mw/Mn) of weight average molecular weight (Mw) to number average molecular weight (Mn) of 1.9 to 2.1 and polymerized by using a germanium-based polymerization catalyst, (iii) the weight ratio {(A+D)/B} of the total of the components A and D to the component B is 70/30 to 80/20, and (iv) the weight ratio (A/B) of the component A to the component B is 65/35 to 75/25.

(2) A resin composition according to claim 1, comprising 55 to 65 wt % of a resin component and 45 to 35 wt % of glass fibers (component D) having an average fiber diameter of 10 to 15 μm and an average fiber length of 230 to 270 μm, wherein the resin component is composed of (i) a bisphenol A type aromatic polycarbonate (component A) having a viscosity average molecular weight of 16,000 to 23,000 and (ii) polyethylene terephthalate (component B) having an intrinsic viscosity (IV) of 0.49 to 0.52 dl/g, a terminal carboxyl group content of 23 to 28 eq/ton and a ratio (Mw/Mn) of weight average molecular weight (Mw) to number average molecular weight (Mn) of 1.9 to 2.1 and polymerized by using a germanium-based polymerization catalyst, (iii) the weight ratio {(A+D)/B} of the total of the components A and D to the component B is 65/35 to 75/25, and (iv) the weight ratio (A/B) of the component A to the component B is 45/55 to 55/45.

(3) A resin composition comprising 50 to 100 wt % of a resin component and 0 to 50 wt % of at least one inorganic filler (component D) selected from the group consisting of mica, talc and wollastonite, wherein the resin component is composed of (i) a polycarbonate (component A1) selected from the group consisting of bisphenol A type polycarbonates having a viscosity average molecular weight of 16,000 to 23,000 and (ii) polyethylene terephthalate (component B1) selected from polyethylene terephthalates having an intrinsic viscosity (IV) of 0.45 to 0.57 dl/g, a terminal carboxyl group content of 20 to 35 eq/ton and a ratio (Mw/Mn) of weight average molecular weight (Mw) to number average molecular weight (Mn) of 1.3 to 2.1, (iii) the weight ratio {(A1+D)/B1} of the total of the components A1 and D to the component B1 is 60/40 to 85/15, and (iv) the fluid resin composition has a melt volume rate (MVR value) at 280° C. under a load of 2.16 kg in accordance with ISO1133 standards of 23 to 150 cm³/10 nm, a flexural modulus in accordance with ASTM D-790 standards of 2,000 to 25,000 MPa and a crack incidence rate in chemical resistance evaluation of 0 to 20%.

(4) A resin composition comprising 50 to 100 wt % of a resin component and 0 to 50 wt % of glass fibers (component D), wherein the resin component is composed of (i) a polycarbonate (component A1) selected from the group consisting of bisphenol A type polycarbonates having a viscosity average molecular weight of 16,000 to 23,000 and (ii) polyethylene terephthalate (component B1) selected from polyethylene terephthalates having an intrinsic viscosity (IV) of 0.45 to 0.57 dl/g, a terminal carboxyl group content of 20 to 35 eq/ton and a ratio (Mw/Mn) of weight average molecular weight (Mw) to number average molecular weight (Mn) of 1.3 to 2.1, (iii) the weight ratio {(A1+D)/B1} of the total of the components A1 and D to the component B1 is 60/40 to 85/15, and (iv) the fluid resin composition has a melt volume rate (MVR value) at 280° C. under a load of 2.16 kg in accordance with ISO1133 standards of 10 to 150 cm³/10 min, a flexural modulus in accordance with ASTM D-790 of 8,000 to 25,000 MPa and a crack incidence rate in chemical resistance evaluation of 0 to 10%.

(Other Components)

The resin composition of the present invention may further contain an aromatic polyester other than the component B, flame retardant, flame retardant aid (such as sodium antimonite or antimony trioxide), char forming compound (such as a novolak phenolic resin or a condensate of a pitch and formaldehyde), nucleating agent (such as sodium stearate or ethylene-sodium acrylate), dripping inhibitor (such as fluorinated polyolefin having fibril formability), heat stabilizer, antioxidant (such as hindered phenolic antioxidant or phosphorus-based antioxidant), ultraviolet light absorber, optical stabilizer, release agent, antistatic agent, foaming agent, flow modifier, antibacterial agent, optical catalyst-based antifouling agent (such as particulate titanium oxide or particulate zinc oxide), lubricant, colorant, fluorescent brightener, light accumulating pigment, fluorescent dye, infrared light absorber and photochromic agent as long as it satisfies the above requirements.

(i) Aromatic Polyester

An aromatic polyester other than polyethylene terephthalate may be added to the resin composition of the present invention. Examples of the aromatic polyester include polypropylene terephthalate, polybutylene terephthalate (PBT), polyhexylene terephthalate, polyethylene naphthalate (PEN), polybutylene naphthalate (PBN) and polyethylene-1,2-bis(phenoxy)ethane-4,4'-dicarboxylate, and copolyesters such as polyethylene isophthalate/terephthalate resin and polybutylene terephthalate/isophthalate. The amount of the aromatic polyester is preferably 1 to 100 parts by weight, more preferably 10 to 90 parts by weight, much more preferably 30 to 60 parts by weight based on 100 parts by weight of PET as the component B.

(ii) Heat Stabilizer

A heat stabilizer is preferably added to the resin composition of the present invention. The heat stabilizer is preferably a phosphorus-based stabilizer. Examples of the phosphorus-based stabilizer include phosphorous acid, phosphoric acid, phosphonous acid, phosphonic acid and esters thereof and tertiary phosphine. The phosphorus-based stabilizers may be used alone or in combination of two or more.

Examples of the phosphite compound include trialkyl phosphites such as tridecyl phosphite, dialkylmonoaryl phosphites such as didecylmonophenyl phosphite, monoalkyldiaryl phosphites such as monobutyldiphenyl phosphite, triaryl phosphites such as triphenyl phosphite and tris(2,4-di-tert-butylphenyl)phosphite, pentaerythritol phosphites such as distearyl pentaerythritol diphosphite, bis(2,4-di-tert-butylphenyl)pentaerythritol diphosphite, bis(2,4-dicumylphenyl)pentaerythritol diphosphite and bis(2,6-di-tert-butyl-4-methylphenyl)pentaerythritol diphosphite, and cyclic phosphites such as 2,2-methylenebis(4,6-di-tert-butylphenyl)octyl phosphite and 2,2'-methylenebis(4,6-di-tert-butylphenyl)(2,4-di-tert-butylphenyl)phosphite.

Examples of the phosphate compound include tributyl phosphate, trimethyl phosphate, tricresyl phosphate, triphenyl phosphate, triethyl phosphate, diphenylcresyl phosphate, diphenyl monoorthoxenyl phosphate, tributoxyethyl phosphate and diisopropyl phosphate. Out of these, triphenyl phosphate and trimethyl phosphate are preferred.

Preferred examples of the phosphonite compound include tetrakis(di-tert-butylphenyl)-biphenylene diphosphonite and bis(di-tert-butylphenyl)-phenyl-phenyl phosphonite, out of which tetrakis(2,4-di-tert-butylphenyl)-biphenylene diphosphonite and bis(2,4-di-tert-butylphenyl)-phenyl-phenyl phosphonite are more preferred. It is possible and preferred to use the phosphonite compound in combination with a phosphite compound having an aryl group substituted for two or more alkyl groups.

Examples of the phosphonate compound include dimethyl benzenephosphonate, diethyl benzenephosphonate and dipropyl benzenephosphonate. Examples of the tertiary phosphine include triphenyl phosphine.

The amount of the phosphorus-based stabilizer is preferably 0.0001 to 1 wt %, more preferably 0.0005 to 0.5 wt %, much more preferably 0.002 to 0.3 wt % based on 100 wt % of the resin composition of the present invention.

(iii) Antioxidant

An antioxidant may be added to the resin composition of the present invention. The antioxidant can improve the heat stability and heat aging resistance at the time of molding of the resin composition. The antioxidant is preferably a hindered phenolic antioxidant. Examples of the hindered phenolic antioxidant include octadecyl-3-(3,5-di-tert-butyl-4-hydroxyphenyl)propionate, 2-tert-butyl-6-(3'-tert-butyl-5'-methyl-2'-hydroxybenzyl)-4-methylphenyl acrylate, 4,4'-butylidenebis(3-methyl-6-tert-butylphenol), triethylene glycol-N-bis-3-(3-tert-butyl-4-hydroxy-5-methylphenyl)propionate, 3,9-bis{2-[3-(3-tert-butyl-4-hydroxy-5-methylphenyl)propionyloxy]-1,1-dimethylethyl}-2,4,8,10-tetraoxaspiro[5,5]undecane, N,N'-hexamethylenebis-(3,5-di-tert-butyl-4-hydroxyhydrocinnamide), 1,3,5-trimethyl-2,4,6-tris(3,5-di-tert-butyl-4-hydroxybenzyl)benzene and tetrakis[methylene-3-(3,5-di-tert-butyl-4-hydroxyphenyl)propionate]methane. These are easily acquired. Out of these, octadecyl-3-(3,5-di-tert-butyl-4-hydroxyphenyl)propionate is preferred. The hindered phenolic antioxidants may be used alone or in combination of two or more. The amount of the antioxidant is preferably 0.0001 to 0.05 wt % based on 100 wt % of the resin composition.

(iv) Ultraviolet Light Absorber

The ultraviolet light absorber is selected from a conventionally known benzophenone-based compound, benzotriazole-based compound, hydroxyphenyltriazine-based compound, cyclic iminoester-based compound and cyanoacrylate-based compound. Specific examples of the ultraviolet light absorber include 2-(2H-benzotriazol-2-yl)-p-cresol, 2-(2H-benzotriazol-2-yl)-4-(1,1,3,3-tetramethylbutyl)phenol, 2-(2H-benzotriazol-2-yl)-4,6-bis(1-methyl-1-phenylethyl)phenol, 2-[5-chloro(2H)-benzotriazol-2-yl]-4-methyl-6-tert-butyl phenol, 2,2'-methylenebis[6-(2H-benzotriazol-2-yl)-4-(1,1,3,3-tetramethylbutyl)phenol], 2-(4,6-diphenyl-1,3,5-triazin-2-yl)-5-[(hexyl)oxy]phenol, 2,2'-p-phenylenebis(3,1-benzoxazin-4-one) and 1,3-bis[(2-cyano-3,3-diphenylacryloyl)oxy]-2,2-bis[[(2-cyano-3,3-diphenylacryloyl]oxy]methyl]propane. Further, hindered amine-based optical stabilizers such as bis(2,2,6,6-tetramethyl-4-piperidyl)sebacate and bis(1,2,2,6,6-pentamethyl-4-piperidyl)sebacate may also be used. The amount of the ultraviolet light absorber or optical stabilizer is 0.01 to 1 wt % based on 100 wt % of the resin composition.

(v) Release Agent

The release agent is selected from an olefin-based wax, silicone oil, fluorine oil, organopolysiloxane, ester of a monohydric or polyhydric alcohol and a higher fatty acid, paraffin wax and beeswax. Out of these, an ester of a monohydric or polyhydric alcohol and a higher fatty acid is preferred. The higher fatty acid contains 60 wt % or more of a fatty acid having preferably 17 or more carbon atoms, more preferably 17 to 32 carbon atoms, much more preferably 26 to 32 carbon atoms. The higher fatty acid is preferably a higher fatty acid comprising montanic acid as the main component. The higher fatty acid is manufactured by oxidizing montan wax. Examples of the monohydric alcohol include dodecanol, tetradecanol, hexadecanol, octadecanol, eicosanol, tetracosanol, ceryl alcohol and triacontanol.

Examples of the polyhydric alcohol include glycerin, diglycerin, polyglycerin (such as decaglycerin), pentaerythritol, dipentaerythritol, trimethylolpropane, diethylene glycol and propylene glycol. The alcohol component in the ester of a monohydric or polyhydric alcohol and a higher fatty acid is more preferably a polyhydric alcohol. Out of the above polyhydric alcohols, glycerin, pentaerythritol, dipentaerythritol and trimethylolpropane are preferred, and glycerin is particularly preferred.

The amount of the release agent is preferably 0.001 to 2 wt %, more preferably 0.005 to 1 wt %, much more preferably 0.01 to 1 wt %, particularly preferably 0.01 to 0.5 wt % based on 100 wt % of the resin composition.

(vi) Antistatic Agent

Examples of the antistatic agent include polyether ester amide, glycerin monostearate, alkali (earth) metal salts of a naphthalenesulfonic acid-formaldehyde high condensate, alkali (earth) metal salts of dodecylbenzenesulfonic acid, ammonium salts of dodecylbenzenesulfonic acid, phosphonium salts of dodecylbenzenesulfonic acid, maleic anhydride monoglyceride and maleic anhydride diglyceride. The amount of the antistatic agent is preferably 0.01 to 10 wt % based on 100 wt % of the resin composition.

(vii) Flow Modifier

Examples of the flow modifier include plasticizers (typified by phosphates, phosphate oligomers, phosphagen oligomers, fatty acid esters, aliphatic polyesters, and aliphatic polycarbonates), other thermoplastic resins and thermoplastic resin oligomers having high stiffness and high fluidity (typified by polymers having a weight average molecular weight of less than 40,000 prepared by polymerizing at least one selected from styrene, acrylonitrile and polymethyl methacrylate, and highly stiff polycarbonate oligomers), liquid crystal polymers (typified by liquid crystal polyesters), rigid molecules (typified by poly p-phenylene compounds) and lubricants (typified by mineral oil, synthetic oil, higher fatty acid esters, higher fatty acid amides, polyorganosiloxane, olefin-based wax, polyalkylene glycol and fluorine oil).

The flow modifier can be added in an amount of preferably 0.1 to 10 wt %, more preferably 1 to 8 wt % based on 100 wt %, of the resin composition.

(viii) Flame Retardant

Examples of the flame retardant include red phosphorus-based flame retardants typified by red phosphorus and stabilized red phosphorus prepared by microcapsulating the surface of red phosphor us with a conventionally known thermosetting resin and/or an inorganic material; halogen-based flame retardants typified by tetrabromobisphenol A, tetrabromobisphenol A oligomer, brominated bisphenol-based epoxy resin, brominated bisphenol-based phenoxy resin, brominated bisphenol-based polycarbonate, brominated polystyrene, brominated crosslinked polystyrene, brominated polyphenylene ether, polydibromophenylene ether, decabromodiphenyl oxide bisphenol condensate and halogen-containing phosphates; organic phosphate-based flame retardants typified by monophosphate compounds such as triphenyl phosphate, condensation phosphates such as resorcinol bis(dixylenylphosphate) and bisphenol A bis(diphenylphosphate) and other pentaerythritol diphenyl diphosphates; inorganic flame retardants typified by inorganic phosphates such as ammonium polyphosphate, aluminum phosphate and zirconium phosphate, hydrates of inorganic metal compounds such as aluminum hydroxide and magnesium hydroxide, and zinc borate, zinc metaborate, magnesium oxide, molybdenum oxide, zirconium oxide, tin oxide and antimony oxide; organic alkali (earth) metal salt-based flame retardants typified by potassium perfluorobutanesulfonate, calcium perfluorobutanesulfonate, cesium perfluorobutanesulfonate, potassium diphenylsulfone-3-sulfonate and potassium diphenylsulfone-3,3'-disulfonate; silicone-based flame retardants typified by (poly)organosiloxane compounds having an aryl group and an alkoxy group, (poly)organosiloxane compounds having an aryl group and a Si—H group and a copolymer of (poly)organosiloxane and polycarbonate resin; and phosphagen-based flame retardants typified by phenoxyphosphagen oligomers and cyclic phenoxy phosphagen oligomers.

The amount of the flame retardant is preferably 0.1 to 50 wt %, more preferably 0.1 to 20 wt % based on 100 wt % of the resin composition.

(ix) Dripping Inhibitor

The dripping inhibitor prevents melt dripping at the time of combustion and further improves flame retardancy. The dripping inhibitor is preferably a fluorine-containing dripping inhibitor.

The fluorine-containing dripping inhibitor preferred as the dripping inhibitor is, for example, a fluorine-containing polymer having fibril formability. Examples of the polymer include polytetrafluoroethylene, tetrafluoroethylene-based copolymer (such as tetrafluoroethylene/hexafluoropropylene copolymer), partially fluorinated polymers disclosed by U.S. Pat. No. 4,379,910 and polycarbonate resin manufactured from a fluorinated diphenol. Out of these, polytetrafluoroethylene (may be abbreviated as PTFE hereinafter) is particularly preferred.

PTFE having fibril formability has an extremely high molecular weight and tends to become fibrous by bonding to another PTFE due to an external function such as shear force. The number average molecular weight of PTFE is 1,500,000 to several tens of million. The lower limit of the number average molecular weight is more preferably 3,000,000. The number average molecular weight is calculated based on the melt viscosity of polytetrafluoroethylene at 380° C. as disclosed by JP-A 6-145520. That is, fibrillated PTFE has a melt viscosity at 380° C. measured by the method disclosed by the above publication of $10^7$ to $10^{13}$ poise, preferably $10^8$ to $10^{12}$ poise. The PTFE may be used in a solid form or aqueous dispersion form. A mixture of PTFE having fibril formability and another resin may also be used to improve dispersibility in a resin and obtain higher flame retardancy and mechanical properties.

Commercially available products of PTFE having fibril formability include Teflon (registered trademark) 6J of Mitsui•DuPont Fluorochemical Co., Ltd. and Polyflon MPA FA500 and F-201L of Daikin Industries, Ltd.

Commercially available products of the aqueous dispersion of PTFE include Fluon AD-1 and AD-936 of Asahi ICI Fluoropolymers Co., Ltd., Fluon D-1 and D-2 of Daikin Industries, Ltd. and Teflon (registered trademark) 30J of Mitsui•DuPont Fluorochemical Co., Ltd.

The PTFE mixture may be used, which was manufactured by (1) a method in which an aqueous dispersion of PTFE and an aqueous dispersion or solution of an organic polymer are mixed together and co-precipitation is carried out to obtain a coaggregated mixture (disclosed by JP-A 60-258263 and JP-A 63-154744), (2) a method in which an aqueous dispersion of PTFE and dried organic polymer particles are mixed together (disclosed by JP-A4-272957), (3) a method in which an aqueous dispersion of PTFE and an organic polymer particle solution are uniformly mixed together and media are removed from the mixture at the same time (disclosed by JP-A 06-220210 and JP-A 08-188653), (4) a method in which a monomer for forming an organic polymer is polymerized in an aqueous dispersion of PTFE (disclosed by JP-A 9-95583), or (5) a method in which an aqueous dispersion of PTFE and an dispersion of an organic polymer are uniformly mixed together and a vinyl-based monomer is polymerized in the mixed dispersion to obtain a mixture (disclosed by JP-A 11-29679). Commercially available products of the PTFE mixture include Metabrene A3800 (trade name) of Mitsubishi Rayon Co., Ltd. and BLENDEX B449 (trade name) of GE Specialty Chemicals Co., Ltd.

The amount of PTFE in the above mixture is preferably 1 to 60 wt %, more preferably 5 to 55 wt % based on 100 wt % of the PTFE mixture. When the amount of PTFE falls within the above range, the high dispersibility of PTFE can be achieved.

The amount of the dripping inhibitor is preferably 0.01 to 10 wt %, more preferably 0.1 to 3 wt % based on 100 wt % of the resin composition.

(Manufacture of Resin Composition)

The resin composition of the present invention can be manufactured by pre-mixing the components A and B and others, melt kneading the pre-mixture and pelletizing the obtained kneaded product. Examples of the pre-mixing means include a Nauter mixer, twin-cylinder mixer, Henschel mixer, mechanochemical device and extrusion mixer. During pre-mixing, granulation may be optionally carried out by an extrusion granulator or a briquetting machine. After pre-mixing, the above components are preferably melt kneaded together by a melt kneader typified by a vented double-screw extruder and pelletized by a device such as a pelletizer. Other examples of the melt kneader include a Banbury mixer, kneading roll and isothermic stirrer. Out of these, a vented double-screw extruder is preferred.

Alternatively, all the components may be supplied into the melt kneader typified by a double-screw extruder independently without pre-mixing the each component. Or, after some of the components are pre-mixed together, the resulting mixture may be supplied into the melt kneader independently of the other components. Particularly when an inorganic filler is used, it is preferably supplied into a molten resin from a feed port at a halfway to the extruder by using a feeder such as a side feeder. The same can be said of pre-mixing means and granulation. When there is a liquid component in components to be composed, a so-called liquid injector or liquid adder may be used to supply it into the melt kneader.

Further, the water contents of the components A and B before melt kneading are preferably low. Therefore, after either one or both of the components A and B are dried with hot air, electromagnetically or in vacuum, they are more preferably melt kneaded. The suction degree of the vent during melt kneading is preferably 1 to 60 kPa, more preferably 2 to 30 kPa.

Preferably, the resin composition extruded as described above is cut directly to be pelletized, or formed into a strand which is cut by a pelletizer to be pelletized. When the influence of external dust must be reduced for pelletization, the atmosphere surrounding the extruder is preferably cleaned. In the manufacture of the pellet, various methods already proposed for polycarbonate resins for optical disks are preferably used to narrow the shape distribution of pellets and reduce the number of miscut products, the amount of fine powders generated during transportation or handling and the number of cells (vacuum cells) formed in the inside of the strand or pellet. Thereby, the molding cycle can be increased and the number of defects such as silver streaks can be reduced. The shape of the pellet may be columnar, square pillar-like and spherical but preferably columnar. The diameter of the column is preferably 1 to 5 mm, more preferably 1.5 to 4, much more preferably 2 to 3.3 mm. The length of the column is preferably 1 to 30 mm, more preferably 2 to 5 mm, much more preferably 2.5 to 3.5 mm.

A molded product such as a car exterior material of the present invention can be obtained by injection molding the pellet of the resin composition of the present invention. Although the pellet is preferably a single pellet containing all the components constituting the molded product, pellets which differ in constituent components may be mixed together at the time of injection molding to obtain a molded product.

<Molded Product>

The present invention includes a molded product of the above resin composition. Examples of the molded product include car parts such as a car exterior material and OA equipment parts.

<Car Exterior Material>

The present invention includes a car exterior material which is the above molded product. The car exterior material is mainly composed of a design surface formed on either one of the front and rear surfaces and a portion which does not require a design and is selected from the group consisting of a recess from the design surface and a through portion having no surface.

The surface roughness (Ra) measured in accordance with JIS B0601-1994 of the design surface of the car exterior material is preferably 0.001 to 3 μm, more preferably 0.01 to 1 μm and the breaking energy in a high-speed surface impact test measured at 23° C. is preferably 3 to 70 J.

The surface roughness of the molded product depends on the surface smoothness of a metal mold, molding conditions, mold equipment such as insulated runner mold or a quick heating/cooling mold, and a molding material. When the surface roughness (Ra) falls below the above range, these equipment become excessive or molding stability tends to be lost. When the surface roughness (Ra) exceeds the above range, the obtained product tends to become unsatisfactory as a car exterior material or excessive coating is required. When Ra is 0.01 to 1 μm, good balance among these is obtained.

The car exterior material preferably has a coating film on at least the design surface. That is, the car exterior material is preferably a car exterior material having a coating film formed by applying a coating material to at least the design surface after molding and then curing it at a temperature of 100 to 140° C. The above temperature range is more preferably 105 to 135° C., much more preferably 115 to 135° C. As the temperature for baking the coating material becomes higher, the color difference between a steel plate and the coating film becomes smaller and the gloss becomes better with the result that high-grade coating becomes possible. According to a preferred embodiment of the present invention, the car exterior material of the present invention can withstand the above coating completely. New coating materials (such as aqueous coating material and powder coating material) are now under study from the viewpoint of environmental problems. These new coating materials can be suitably used for the molded product of the present invention. Further, film insert molding is being studied energetically to eliminate coating. The molded product of the present invention is well suited for film insert molding, particularly deep drawing film insert molding, as compared with an ordinary injection molded product.

The design surface of the car exterior material of the present invention is a surface which can be recognized from the outside when a vehicle is put at least in a state that it can run and observed.

The car exterior material is preferably attached to a frame by a rubber-like adhesive. The rubber-like adhesive may be a known adhesive but preferably a two-liquid urethane adhesive. A preferred example of the two-liquid urethane adhesive is the BETAMATE2810 (trade name, combination of agents A and B/S) of Dow Automotive Co., Ltd. A primer is preferably used in the adhesive and a preferred example of the primer is the BETAPRIME5404 (trade name) of Dow Automotive Co., Ltd.

Preferably, the car exterior material has a light transmitting member or an illuminating device which is attached to at least one of the recess and the through portion. Thereby, the car exterior material can have a higher function as a module part.

The maximum projection area of the car exterior material is preferably 1,500 to 40,000 $cm^2$, more preferably 2,000 to 20,000 $cm^2$, much more preferably 2,200 to 15,000 $cm^2$.

Examples of the car exterior material include a back panel, fender, bumper, door panel, pillar, side protector, side mall, rear protector, rear mall, spoilers, hood, roof panel, trunk lid, detachable top and window reflector. The car exterior material of the present invention is suitable for use as a vertical external plate such as fender or door panel. The cowl of a motorcycle and the panel of the cabin of a tractor are also such examples.

The resin composition constituting the car exterior material preferably comprises 40 to 90 wt % of PC (component A), 5 to 35 wt % of PET (component B), 1 to 8 wt % of a rubber-like polymer (component C) and 3 to 25 wt % of an inorganic filler (component D) based on 100 wt % of the resin composition.

<Process of Manufacturing Car Exterior Material>

The present invention includes a process of manufacturing a car exterior material from the above resin composition. The process makes use of cascade molding by SVG method. In the above process, the car exterior material (ii) and the resin composition (iii) are as described above. The mold (i) has the following features.

(i) The mold has (i-1) a gate-A and a gate-B, (i-2) the gate-B is supplied with a molten resin so that it joins a flow of a molten resin flowing in from another gate after the flow passes and the gate-A is supplied with a molten resin without joining the flow of the molten resin, and (i-3) the gates in the mold are each installed in an area having a linear distance of at least 20 cm on the surface of the exterior material where other gates are not existent.

The mold is preferably a gate such that all the gates are formed in at least one portion which does not require a design and is selected from the group consisting of the recess, the end portion of the through portion and the end portion of the molded product.

The mold is more preferably such that (i-4) the gate-B is supplied with a molten resin so that it joins a flow of a molten resin flowing in from another gate after the flow passes by the control of a supply control valve provided in a channel communicating with the gate-B after the resin is supplied from the gate-A. The control of the control valve may be carried out by any method using a commercially available device. For example, time control, screw position control and cavity inner pressure control may be employed. When the supply of the molten resin to the gate-B is too quick, a back flow of the molten resin is formed, thereby disturbing the flow of the resin with the result of a bad appearance or the formation of a weld line. When the supply is too slow, the molten resin from another gate is cooled, thereby making a big density difference between the molten resin and the resin of the gate-B with the result of a bad appearance. Therefore, the timings of opening and closing the gate must be controlled to eliminate such inconvenience. Further, it is preferred to determine the position of the gate so that the condition of the opening and closing timings can be made as permissive as possible.

In cascade molding by SVG method, the molten resin must flow from any gate to at least another gate excluding the gate to which the molten resin is supplied finally and does not pass through other gates. At the gate to which the molten resin is supplied finally, the molten resin must flow to the end of its product.

In the present invention, as long as the gates satisfy the above (i-3), their positions are not limited. However, when the gates are arranged such that the distance between the gate to which the molten resin has been supplied and the gate through which the molten resin passes is especially shorter than the distances between the other gates and the amount of the resin supplied from some gates is small due to the above arrangement of the gates, the following problems readily occur. (a) It is difficult to control the opening and closing of the gates, and (b) the resin thermally deteriorates because the residence time of the molten resin is long in the portion where the amount of the supplied resin is small. Also when the amount of the resin supplied from the gate to which the molten resin is supplied finally is small, the above problem (b) occurs.

Therefore, the ratio of the volume (Vi) of the resin supplied from each gate to the average volume (Vave) obtained by dividing the total volume of the resin filled into the mold by the number of gates is preferably $0.5 \leq Vi/Vave \leq 1.5$, more preferably $0.6 \leq Vi/Vave \leq 1.4$, much more preferably $0.7 \leq Vi/Vave \leq 1.3$.

When the above preferred relationship is satisfied, the distance between gates must be made large in a thin portion. Therefore, in cascade molding by SVG method, fluidity much higher than that required for multi-gate molding is needed. Since the resin composition of the present invention satisfies this requirement, an excellent car exterior material can be manufactured by the cascade molding of the resin composition by SVG method. When the above preferred relationship is satisfied, the molded product is preferably as uniform in thickness as possible throughout the product. Therefore, the thickness of the car exterior material of the present invention is preferably within ±50% or less, more preferably ±30% or less of the average thickness. The average thickness is a value obtained by dividing the volume ($mm^3$), of the molded product by the surface area ($mm^2$) of the molded product.

When the distance between the gate to which the molten resin has been supplied and the gate through which the molten resin from the gate passes is too large, the flowability of the molten resin tends to become unsatisfactory. Therefore, as for the above condition (i-3), the gates in the mold are preferably each installed in an area having a linear distance of preferably less than 20 cm where other gates are not existent and 20 to 80 cm where other gates are existent, more preferably less than 25 cm where other gates are not existent and 25 to 70 cm where other gates are existent, much more preferably less than 25 cm where other gates are not existent and 25 to 60 cm where other gates are existent on the surface of the exterior material.

Conventionally known injection molding such as injection compression molding, hollow molding, quick heating/cooling molding and two-color molding may be used at the same time to manufacture part or all of the car exterior material. It is effective to use hollow molding for the thick portion of a molded product, the two-color molding of a transparent resin material into the through portion or recess of the car exterior material, the injection compression molding of a transparent member to be two-color molded, and quick heating/cooling molding for a portion which requires a design.

According to the process of manufacturing a car exterior material of the present invention, the weld line of the obtained molded product can be suppressed. According to the process of manufacturing a car exterior material of the present invention, the degree of freedom of the number of gates is enhanced with the result that a large-sized molded product can be injection molded with relatively small clamping force.

EXAMPLES

The following examples are provided to further illustrate the present invention.

I. Raw Materials (Component A)

PC1: linear aromatic polycarbonate powder having a viscosity average molecular weight of 19,700 (Panlite L-1225WX (trade name) of Teijin Chemical Ltd.)

PC2: linear aromatic polycarbonate powder having a viscosity average molecular weight of 16,000 (Panlite CM-1000 (trade name) of Teijin Chemical Ltd.)

PC3: linear aromatic polycarbonate powder having a viscosity average molecular weight of 20,900 (Panlite L-1225WS (trade name) of Teijin Chemical Ltd.)

PC4: linear aromatic polycarbonate pellet having a viscosity average molecular weight of 19,700 (Panlite L-1225L (trade name) of Teijin Chemical Ltd.)

(Component B)

PET1: polyethylene terephthalate polymerized by using a germanium compound polymerization catalyst and having an IV value of 0.51, a terminal carboxyl group content of 26.3 eq/ton and a Mw/Mn of 2.0 (TR-MB of Teijin Chemical Ltd.)

PET2: polyethylene terephthalate polymerized by using a germanium compound polymerization catalyst and having an IV value of 0.56, a terminal carboxyl group content of 23.2 eq/ton and a Mw/Mn of 2.1 (TR-L of Teijin Chemical Ltd.)

(Components Other than Component B)

PET3: polyethylene terephthalate polymerized by using a germanium compound polymerization catalyst and having an IV value of 0.70, a terminal carboxyl group content of 22.0 eq/ton and a Mw/Mn of 1.9 (TR-4550 (trade name) of Teijin Chemical Ltd.)

PET4: polyethylene terephthalate polymerized by using a germanium compound polymerization catalyst and having an IV value of 0.83, a terminal carboxyl group content of 18.0 eq/ton and a Mw/Mn of 2.1 (TR-8580 (trade name) of Teijin Chemical Ltd.)

(Component C)

IM1: butadiene•alkyl methacrylate•styrene copolymer (BTA712 (trade name) of Rohm and Harse Co., Ltd.)

IM2: butadiene•alkyl acrylate•alkyl methacrylate copolymer (Paraloid EXL2602 (trade name) of Rohm and Harse Co., Ltd.)

(Component D)

WSN1: wollastonite (NYGLOS4 (trade name) of NYCO Co., Ltd.)

WSN2: wollastonite (PH-330 (trade name) of Kawatetsu Kogyo Co., Ltd.)

GF: glass fiber (3PE-944 (trade name) of Nitto Boseki Co., Ltd.)

(Component E)

WAX: 1-alkene•maleic anhydride copolymer (Diyacalna 30M (trade name) of Mitsubishi Chemical Co., Ltd.)

(Others)

PBT1: polybutylene terephthalate having an IV value of 0.87 (Juranex 500FP (trade name) of Polyplastics Co., Ltd.)

ST1: phosphorus-based stabilizer (Adecastab PEP-8 (trade name) of Asahi Denka Kogyo Co., Ltd.)

ST2: phosphorus-based stabilizer (Adecastab PEP-24G (trade name) of Asahi Denka Kogyo Co., Ltd.)

UV: ultraviolet light absorber (Seasorb 701 (trade name) of Sipro Kasei Co., Ltd.)

CB: carbon black master (Royal Black 904S (trade name) of Koshigaya Kasei Kogyo Co., Ltd.)

COL: dispersion prepared by adding 25 wt % of titanium dioxide (RTC30 of Taioxide Japan Co., Ltd.) and 0.5 wt % of carbon black (#970 of Mitsubishi Chemical Co., Ltd.) to the above PC1 to make it 100 wt % and dry blending them together by a super mixer II. Preparation of Test Specimen A pellet of the manufactured resin composition was dried at 120° C. for 4 hours by a hot air drier and molded by a molding machine having a clamping force of 1,470 kN (T-150D of FANUC Ltd.) at a cylinder temperature of 270° C. and a mold temperature of 70° C. The shape of the test specimen was based on standards.

III. Evaluation of Characteristic Properties of Resin Composition (i) MVR (unit: $cm^3/10$ min): The melt volume rate (MVR value) of the manufactured resin pellet was measured under a load of 2.16 kg at 280° C. in accordance with ISO 1133 standards. Before the measurement, the pellet was dried at 120° C. for 4 hours by a hot drier. The Melt Indexer 2A of Toyo Seiki Co., Ltd. was used for the measurement.

(ii) Deflection temperature under load (unit: ° C.): A specimen was prepared by the above method to measure its deflection temperature under a load of 0.45 MPa in accordance with ASTM D-648.

(iii) Flexural modulus (unit: MPa): A specimen was prepared by the above method to measure its flexural modulus in accordance with ASTM D-790.

(iv) Impact resistance (unit: J/m): A specimen was prepared by the above method to measure its Izod impact value (notched) at 23° C. in accordance with ASTM D-256.

(v) Chemical resistance: A tensile test specimen was prepared by the above method in accordance with ASTM D-638. A 0.5% warp was applied to the specimen by a three-point bending jig and the specimen was then immersed in gasoline (regular gasoline of Esso Corporation) at 23° C. for 10 minutes. This tensile test was made on 10 specimens and the number of specimens which did not crack was counted.

(vi) Heat stability: Square plates (150×150×3 mm t) were molded from 20 shots continuously in the same manner as the preparation of the above specimen except that the cylinder temperature was changed to 280° C. and then the molding cycle was intentionally stopped to carry out 10-minute residence. After residence, the appearances of molded products obtained from the first three shots were checked and evaluated based on the following criteria.

⊚ No silver streak was seen on the surfaces of the molded products.

○ A silver streak was seen on the molded product manufactured from the first shot but no silver streak was seen on the molded products manufactured from the second and third shots.

Examples 1 to 6

Manufacture of Resin Composition

Pellets (E1) to (E6) of resin compositions were manufactured from the types and amounts of raw materials shown in Table 1 by an extruder. The extruder was the TEM-48SS of Toshiba Machine Co., Ltd. (L/D=50, 13 barrels). When the component A was powdery, a puddle drier was used and when the component A was a pellet, a hopper drier was used to dry the component A at 120° C. for 4 hours or longer and the dried component A was injected from the main feeder. The component B was dried by a hopper drier at 120° C. for 4 hours or longer and injected from the main feeder. The component D and wax were pre-mixed together and injected from the side feeder by using a meter different from that of the component B. Other components were pre-mixed together by a Henschel mixer and injected from the main feeder. A vent was set in the 10-th barrel to carry out suction at a vacuum degree of 6 kPa or less. Other extrusion conditions included a cylinder temperature of 260° C., a die temperature of 270° C., a delivery rate of 200 kg/hr and a screw revolution of 250 rpm. The characteristic properties of the obtained pellets (E1) to (E6) are shown in Table 1.

Comparative Examples 1 to 7

The procedure of Examples 1 to 6 was repeated to manufacture pellets (CE1) to (CE7) of the resin compositions except that the types and amounts of raw materials were changed as shown in Table 1. The characteristic properties of the obtained pellets (CE1) to (CE7) are shown in Table 1.

TABLE 1

| Name | code | unit | Examples 1 | 2 | 3 | 4 | 5 | 6 |
|---|---|---|---|---|---|---|---|---|
| Component A | PC1 | part by weight | | 57.2 | | 57.2 | 51.6 | 28.92 |
| | PC2 | part by weight | | | | | | |
| | PC3 | part by weight | 63.5 | | | | | |
| | PC4 | part by weight | | | 57.2 | | | |
| Component B | PET1 | part by weight | 30 | 24 | 24 | | 20 | 30 |
| | PET2 | part by weight | | | | 24 | | |
| Components other than component B | PET3 | part by weight | | | | | | |
| | PET4 | part by weight | | | | | | |
| Component C | IM1 | part by weight | | 3 | 3 | 3 | | |
| | IM2 | part by weight | 5 | | | | | |
| Component D | WSN1 | part by weight | | 10 | 10 | 10 | | |
| | WSN2 | part by weight | | | | | 25 | |
| | GF | part by weight | | | | | | 40 |
| Component E | WAX | part by weight | | 0.6 | 0.6 | 0.6 | 1.5 | |
| Others | PBT1 | part by weight | | 3 | 3 | 3 | | |
| | ST1 | part by weight | 0.2 | 0.2 | 0.2 | 0.2 | | 0.08 |
| | ST2 | part by weight | | | | | 0.4 | |
| | UV | part by weight | 0.3 | | | | | |
| | CB | part by weight | 1 | | | | 1.5 | 1 |
| | COL | part by weight | | 2 | 2 | 2 | | |
| MVR | | cm³/10 min | 26 | 27 | 26 | 25 | 24 | 10 |
| Deflection temperature under load | | ° C. | 133 | 137 | 137 | 136 | 138 | 230 or more |
| Flexural modulus | | MPa | 2240 | 3330 | 3300 | 3310 | 6080 | 11800 |
| Impact resistance | | J/m | 440 | 100 | 90 | 100 | 50 | 90 |
| Chemical resistance | | sample number/10 samples | 10 | 10 | 10 | 10 | 10 | 10 |
| Heat stability | | — | ⊚ | ⊚ | ⊚ | ⊚ | ⊚ | ⊚ |
| Pellet No. | | — | (E1) | (E2) | (E3) | (E4) | (E5) | (E6) |

| Name | code | unit | Comparative Examples 1 | 2 | 3 | 4 | 5 | 6 | 7 |
|---|---|---|---|---|---|---|---|---|---|
| Component A | PC1 | part by weight | | 27.2 | | | 57.2 | | 28.92 |
| | PC2 | part by weight | | 30 | | 63.5 | | 57.2 | |
| | PC3 | part by weight | 63.5 | | 63.5 | | | | |
| | PC4 | part by weight | | | | | | | |
| Component B | PET1 | part by weight | | | | | | | |
| | PET2 | part by weight | | | | | | | |
| Components other than component B | PET3 | part by weight | 30 | 24 | | | | | 30 |
| | PET4 | part by weight | | | 30 | 30 | 24 | 24 | |
| Component C | IM1 | part by weight | | 3 | | | 3 | 3 | |
| | IM2 | part by weight | 5 | | 5 | 5 | | | |
| Component D | WSN1 | part by weight | | 10 | | | | | |
| | WSN2 | part by weight | | | | | 10 | 10 | |
| | GF | part by weight | | | | | | | 40 |
| Component E | WAX | part by weight | | 0.6 | | | 0.6 | 0.6 | |
| Others | PBT1 | part by weight | | 3 | | | 3 | 3 | |
| | ST1 | part by weight | 0.2 | 0.2 | 0.2 | 0.2 | 0.2 | 0.2 | 0.08 |
| | ST2 | part by weight | | | | | | | |
| | UV | part by weight | 0.3 | | 0.3 | 0.3 | | | |
| | CB | part by weight | 1 | | 1 | 1 | | | 1 |
| | COL | part by weight | | 2 | | | 2 | 2 | |

TABLE 1-continued

| | | | | | | | | |
|---|---|---|---|---|---|---|---|---|
| MVR | cm³/10 min | 20 | 22 | 12 | 16 | 13 | 17 | 5 |
| Deflection temperature under load | ° C. | 135 | 136 | 132 | 129 | 136 | 134 | 230 or more |
| Flexural modulus | MPa | 2200 | 3230 | 2190 | 2070 | 3190 | 3120 | 10900 |
| Impact resistance | J/m | 630 | 90 | 680 | 160 | 140 | 80 | 90 |
| Chemical resistance | sample number/10 samples | 7 | 7 | 3 | 0 | 4 | 2 | 8 |
| Heat stability | — | ◎ | ◎ | ◎ | ◎ | ◎ | ○ | ○ |
| Pellet No. | — | (CE1) | (CE2) | (CE3) | (CE4) | (CE5) | (CE6) | (CE7) |

As shown in Table 1, the resin composition of the present invention has high fluidity (MVR) and high chemical resistance and is excellent in elasticity, impact resistance and heat stability.

Examples 7 to 12

Manufacture of Molded Products

The pellets (E1) to (E6) were dried at 120° C. for 4 hours to mold car exterior materials shown in FIG. 1. The J1300E-C5 molding machine of The Japan Steel Works, Ltd. was used. The cylinder temperature was set to 270° C. and the mold temperature was set to 60° C. The ends of sprues were connected to the valve gate of a hot runner and the valve gate connected to gates was opened as follows. That is, a gate (16) at the top of the molded product and a lower gate (15) existent on a symmetrical axis were first opened. Thereafter, right after the molten resin from the gate 16 passed through a gate 11, the valve was opened to supply the molten resin from the gate 11. Right after the molten resin from the gate 15 passes through a gate 14, the valve was opened to supply the molten resin from the gate 14. The linear distance on the surface of the exterior material from the gate 16 to the gate 11 was about 33.5 cm, and the linear distance on the surface of the exterior material from the gate 15 to the gate 14 was about 26.8 cm. Pellet Nos. used in Examples are shown in Table 2.

TABLE 2

| | Example | | | | | |
|---|---|---|---|---|---|---|
| | 7 | 8 | 9 | 10 | 11 | 12 |
| Pellet No. | (E1) | (E2) | (E3) | (E4) | (E5) | (E6) |

Comparative Examples 8 to 14

The procedure of Examples 7 to 12 was repeated to form molded products shown in FIG. 1 except that the pellets (CE1) to (CE7) were used. Pellet Nos. used in Comparative Examples are shown in Table 3.

TABLE 3

| | Comparative Example | | | | | | |
|---|---|---|---|---|---|---|---|
| | 8 | 9 | 10 | 11 | 12 | 13 | 14 |
| Pellet No. | (CE1) | (CE2) | (CE3) | (CE4) | (CE5) | (CE6) | (CE7) |

(Evaluation of Moldability)

Molded products in which a weld line was rarely seen on the design surface were obtained by cascade molding in accordance with SVG method in Examples 7 to 12 and Comparative Examples 8 and 9. The weld line on the design surface was recognized by observation under a strong light source and its length was about 1 cm. When the surface roughness (Ra) of the design surface was measured at 5 positions in accordance with JIS B0601-1994, it was 0.15 to 0.20 μm. Since the appearances of the design surfaces were the same, it was judged that all the above positions of the design surfaces could have the above value. As for Example 12, a molded product could be obtained by setting the molding temperature to 300° C.

In Comparative Examples 10 to 13 in which pellets (CE3) to (CE6) were used, as the fluidity of the resin composition was unsatisfactory, a distinct weld line was formed on the design surface even when molding was carried out under the same conditions. The weld line disappeared when the cylinder temperature was set to 300° C. but a silver streak was seen on the design surface. Therefore, a molded product having a good appearance could not be obtained.

In Comparative Example 14 in which the pellet (CE7) was used, even at a molding temperature of 300° C., fluidity became unsatisfactory and a molded product could not be obtained.

(Evaluation of Coatability)

The molded products of Examples 7 to 12 {pellets (E1) to (E6)} and Comparative Examples 8 and 9 {pellets (CE1) and (CE2)} in which satisfactory molded products were obtained were coated. The temperature for baking the coating material was 120° C. After coating, the gate portions of the molded products of Comparative Examples 8 and 9 cracked and the coating material was sucked into the cracked portions, thereby causing so-called "coating suction" with the result of a degraded appearance. As for the molded products of Examples 7 to 12, coated products having a good appearance could be obtained.

EFFECT OF THE INVENTION

The resin composition of the present invention has high chemical resistance while retaining high fluidity and is excellent in impact resistance, heat resistance, stiffness and heat stability. The molded product of the present invention is excellent in impact resistance, heat resistance, stiffness, heat stability, chemical resistance and appearance. According to the process of manufacturing a car exterior material of the present invention, the formation of a weld line is suppressed and a car exterior material having an excellent appearance and surface can be obtained.

INDUSTRIAL FEASIBILITY

Since the resin composition of the present invention is excellent in impact resistance, stiffness and heat resistance, it can be used in a wide variety of industrial fields such as automobiles, OA equipment, electronic and electric appliances, construction materials, agricultural materials and fishing materials.

The invention claimed is:

1. A resin composition comprising 50 to 100 wt % of a resin component and 0 to 50 wt % of an inorganic filler (component D), wherein
the resin component is composed of (i) an aromatic polycarbonate (component A) having a viscosity average molecular weight of 16,000 to 23,000 and (ii) polyethylene terephthalate (component B) having an intrinsic viscosity (IV) of 0.45 to 0.57 dl/g, a terminal carboxyl group content of 20 to 35 eq/ton and a ratio (Mw/Mn) of weight average molecular weight (Mw) to number average molecular weight (Mn) of 1.3 to 2.1, and (iii) the weight ratio {(A+D)/B} of the total of the components A and D to the component B is 60/40 to 85/15.

2. The resin composition according to claim 1, wherein the weight ratio (A/B) of the component A to the component B is 40/60 to 90/10.

3. The resin composition according to claim 1, wherein the intrinsic viscosity (IV) of the component B is 0.47 to 0.55 dl/g.

4. The resin composition according to claim 1 which comprises a rubber-like polymer (component C) in an amount of 1 to 50 parts by weight based on 100 parts by weight of the total of the components A and B.

5. The resin composition according to claim 4, wherein the component C is at least one rubber-like polymer selected from the group consisting of styrene-butadiene copolymer, acrylonitrile-butadiene-styrene copolymer, methyl methacrylate-butadiene-styrene copolymer and methyl methacrylate-(acryl•silicone IPN rubber) copolymer.

6. The resin composition according to claim 1 which comprises a bending inhibitor (component E) in an amount of 0.01 to 10 parts by weight based on 100 parts by weight of the total of the components A and B.

7. The resin composition according to claim 1, wherein the component D is a flaky filler and/or a fibrous filler.

8. The resin composition according to claim 1, wherein the component D is at least one inorganic filler selected from the group consisting of mica, talc, wollastonite and glass fibers.

9. The resin composition according to claim 1, wherein the component D is wollastonite or glass fibers.

10. The resin composition according to claim 1, wherein the component A is a bisphenol A type aromatic polycarbonate.

11. The resin composition according to claim 1, wherein the component B is polyethylene terephthalate polymerized by using a germanium-based polymerization catalyst.

12. The resin composition according to claim 1 comprising 70 to 95 wt % of a resin component and 30 to 5 wt % of wollastonite (component D) having an average fiber diameter of 1 to 2 μm and an aspect ratio of 5 to 9, wherein
the resin component is composed of (i) a bisphenol A type aromatic polycarbonate (component A) having a viscosity average molecular weight of 16,000 to 23,000 and (ii) polyethylene terephthalate (component B) having an intrinsic viscosity (IV) of 0.49 to 0.57 dl/g, a terminal carboxyl group content of 23 to 28 eq/ton and a ratio (Mw/Mn) of weight average molecular weight (Mw) to number average molecular weight (Mn) of 1.9 to 2.1 and polymerized by using a germanium-based polymerization catalyst, (iii) the weight ratio {(A+D)/B} of the total of the components A and D to the component B is 70/30 to 80/20, and (iv) the weight ratio (A/B) of the component A to the component B is 65/35 to 75/25.

13. The resin composition according to claim 1 comprising 55 to 65 wt % of a resin component and 45 to 35 wt % of glass fibers (component D) having an average fiber diameter of 10 to 15 μm and an average fiber length of 230 to 270 μm, wherein
the resin component is composed of (i) a bisphenol A type aromatic polycarbonate (component A) having a viscosity average molecular weight of 16,000 to 23,000 and (ii) polyethylene terephthalate (component B) having an intrinsic viscosity (IV) of 0.49 to 0.52 dl/g, a terminal carboxyl group content of 23 to 28 eq/ton and a ratio (Mw/Mn) of weight average molecular weight (Mw) to number average molecular weight (Mn) of 1.9 to 2.1 and polymerized by using a germanium-based polymerization catalyst, (iii) the weight ratio {(A+D)/B} of the total of the components A and D to the component B is 65/35 to 75/25, and (iv) the weight ratio (A/B) of the component A to the component B is 45/55 to 55/45.

14. A fluid resin composition comprising 50 to 100 wt % of a resin component and 0 to 50 wt % of at least one inorganic filler (component D) selected from the group consisting of mica, talc and wollastonite, wherein
the resin component is composed of (i) a polycarbonate (component A1) selected from the group consisting of bisphenol A type polycarbonates having a viscosity average molecular weight of 16,000 to 23,000 and (ii) polyethylene terephthalate (component B1) selected from polyethylene terephthalates having an intrinsic viscosity (IV) of 0.45 to 0.57 dl/g, a terminal carboxyl group content of 20 to 35 eq/ton and a ratio (Mw/Mn) of weight average molecular weight (Mw) to number average molecular weight (Mn) of 1.3 to 2.1, (iii) the weight ratio {(A+D)/B} of the total of the components A and D to the component B is 60/40 to 85/15, and (iv) the resin composition has a melt volume rate (MVR value) at 280° C. under a load of 2.16 kg in accordance with ISO1133 standards of 23 to 150 cm$^3$/10 min, a flexural modulus in accordance with ASTM D-790 of 2,000 to 25,000 MPa and a crack incidence rate in a chemical resistance test of 0 to 20%.

15. A fluid resin composition comprising 50 to 100 wt % of a resin component and 0 to 50 wt % of glass fibers (component D), wherein
the resin component is composed of (i) a polycarbonate (component A1) selected from the group consisting of bisphenol A type polycarbonates having a viscosity average molecular weight of 16,000 to 23,000 and (ii) polyethylene terephthalate (component B1) selected from polyethylene terephthalates having an intrinsic viscosity (IV) of 0.45 to 0.57 dl/g, a terminal carboxyl group content of 20 to 35 eq/ton and a ratio (Mw/Mn) of weight average molecular weight (Mw) to number average molecular weight (Mn) of 1.3 to 2.1, (iii) the weight ratio {(A+D)/B} of the total of the components A and D to the component B is 60/40 to 85/15, and (iv) the resin composition has a melt volume rate (MVR value) at 280° C. under a load of 2.16 kg in accordance with ISO1133 standards of 10 to 150 cm$^3$/10 min, a flexural modulus in accordance with ASTM D-790 of 8,000 to 25,000 MPa and a crack incidence rate in a chemical resistance test of 0 to 10%.

16. A molded product of the resin composition of claim 1.

17. A car exterior material which is the molded product of claim 16.

18. The car exterior material according to claim 17 which has a surface roughness (Ra) measured in accordance with JIS B0601-1194 of the design surface of 0.001 to 3 μm and a breaking energy in a high-velocity surface impact test measured at 23° C. of 3 to 70 J.

19. The car exterior material according to claim 17 which has a coating film on at least the design surface.

20. The car exterior material according to claim 17 which is attached to a frame by a rubber-like adhesive.

21. The car exterior material according to claim 17, wherein a light transmitting member or an illuminating device is installed in at least one of a recess and a through portion.

22. The car exterior material according to claim 17 which has a maximum projection area of 1,500 to 40,000 cm$^2$.

23. A process of manufacturing a car exterior material by injection molding a resin composition in a mold, wherein
(i) the mold has (i-1) a gate-A and a gate-B, (i-2) the gate-B is supplied with a molten resin so that it joins a flow of a molten resin flowing in from another gate after the flow passes and the gate-A is supplied with a molten resin without joining the flow of the molten resin, and (i-3) the gates in the mold are each installed in an area having a linear distance of at least 20 cm on the surface of the exterior material where other gates are not existent;
(ii) the car exterior material is mainly composed of (ii-1) a design surface on any one of the front and rear surfaces and a portion which does not require a design and is selected from the group consisting of a recess from the design surface and a through portion having no surface; and
(iii) the resin composition comprises (iii-1) 50 to 100 wt % of a resin component and 0 to 50 wt % of an inorganic filler (component D), the resin component is composed of (iii-2) an aromatic polycarbonate (component A) having a viscosity average molecular weight of 16,000 to 23,000 and (iii-3) polyethylene terephthalate (component B) having an intrinsic viscosity (IV) of 0.45 to 0.57 dl/g, a terminal carboxyl group content of 20 to 35 eq/ton and a ratio (Mw/Mn) of weight average molecular weight to number average molecular weight of 1.3 to 2.1, and (iii-4) the weight ratio {(A+D)/B} of the total of the components A and D to the component B is 60/40 to 85/15.

24. The manufacturing process according to claim 23, wherein the gate-B (i-4) of the mold is supplied with a molten resin so that it joins a flow of a molten resin flowing in from another gate after the flow passes by controlling a feed control valve installed in a channel communicating with the gate-B after the resin is supplied from the gate-A.

25. The manufacturing process according to claim 23, wherein all the gates of the mold are installed in at least one portion which does not require a design and is selected from the group consisting of a recess, a through portion, an end portion and the end portion of a molded product.

* * * * *

UNITED STATES PATENT AND TRADEMARK OFFICE
CERTIFICATE OF CORRECTION

PATENT NO. : 7,732,520 B2 Page 1 of 1
APPLICATION NO. : 11/886087
DATED : June 8, 2010
INVENTOR(S) : Tomomitsu Onizawa et al.

It is certified that error appears in the above-identified patent and that said Letters Patent is hereby corrected as shown below:

On the Title Page:

In Item (86): PCT No.: change "PCT/JP2006/005475" to --PCT/JP2006/305475--.

Signed and Sealed this

Third Day of August, 2010

David J. Kappos
*Director of the United States Patent and Trademark Office*